(12) United States Patent
Yang et al.

(10) Patent No.: US 12,744,711 B2
(45) Date of Patent: Sep. 22, 2026

(54) BANDWIDTH CONFIGURATION METHOD AND RELATED DEVICE

(71) Applicant: HUAWEI TECHNOLOGIES CO., LTD., Shenzhen (CN)

(72) Inventors: Zhenan Yang, Nanjing (CN); Lv Ding, Nanjing (CN); Yuan He, Nanjing (CN); Dewei Bao, Nanjing (CN); Chongyu Niu, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 18/761,698

(22) Filed: Jul. 2, 2024

(65) Prior Publication Data

US 2024/0356810 A1 Oct. 24, 2024

Related U.S. Application Data

(63) Continuation of application No. PCT/CN2022/142339, filed on Dec. 27, 2022.

(30) Foreign Application Priority Data

Jan. 4, 2022 (CN) ........................ 202210014285.9
Mar. 31, 2022 (CN) ........................ 202210334477.8

(51) Int. Cl.
*H04L 41/12* (2022.01)

(52) U.S. Cl.
CPC .................................. *H04L 41/12* (2013.01)

(58) Field of Classification Search
CPC ................ H04B 17/318; H04B 17/345; H04L 12/189; H04L 41/12; H04L 43/0864;
(Continued)

(56) References Cited

U.S. PATENT DOCUMENTS

2011/0030037 A1* 2/2011 Olshansky .............. H04L 63/10 726/4
2014/0073319 A1* 3/2014 Navalgund ........... H04W 28/00 455/432.1

(Continued)

FOREIGN PATENT DOCUMENTS

CN 115245022 A * 10/2022 ............ H04W 72/56

OTHER PUBLICATIONS

IEEE P802.11be™/D2.0,Draft Standard for Information technology—Tele-communications and information exchange between systems Local and metropolitan area networks—Specific requirements,Part 11:Wireless LAN Medium Access Control (MAC) and Physical Layer (PHY) Specifications, May 2022, total 873 pages.

*Primary Examiner* — Christopher Biagini

(74) *Attorney, Agent, or Firm* — WOMBLE BOND DICKINSON (US) LLP

(57) ABSTRACT

A bandwidth configuration method and a related device are disclosed. An electronic device first determines bandwidth configuration schemes of N AP groups, and then adjusts the bandwidth configuration scheme of the AP group based on a physical topology similarity between the AP groups. When physical topologies of two AP groups are similar, if bandwidths of two APs at corresponding physical locations in the two AP groups are different, the electronic device determines a larger value of the bandwidths of the two APs as the bandwidths of the two APs.

16 Claims, 9 Drawing Sheets

(58) Field of Classification Search
CPC ..... H04L 43/0888; H04L 43/16; H04L 45/00; H04L 45/16; H04L 5/0035; H04W 16/02; H04W 16/10; H04W 16/12; H04W 24/02; H04W 24/08; H04W 28/20; H04W 48/16; H04W 48/20; H04W 72/04; H04W 72/0453; H04W 72/541; H04W 72/542; H04W 8/005; H04W 84/12; H04W 84/18; H04W 88/08; H04W 92/20
See application file for complete search history.

(56) References Cited

U.S. PATENT DOCUMENTS

2016/0219462 A1* 7/2016 Anderson ............. H04L 47/522
2017/0063629 A1* 3/2017 Ciano ..................... H04L 41/12
2018/0098336 A1* 4/2018 Alpert ................... H04W 16/10
2021/0273852 A1* 9/2021 Horne ................... H04W 24/02
2023/0254217 A1* 8/2023 Zacharias ........... H04L 41/0813
709/220

* cited by examiner

| Number | AP 1 | AP 2 | AP 3 | AP 4 |
|---|---|---|---|---|
| AP 1 | 0 | 11 | 10 | 17 |
| AP 2 | 11 | 0 | 17 | 10 |
| AP 3 | 10 | 17 | 0 | 11 |
| AP 4 | 17 | 10 | 11 | 0 |

AP 1 AP 2 AP 3 AP 4 AP 5 AP 6

| Number | AP 1 | AP 2 | AP 3 | AP 4 | AP 5 | AP 6 |
|---|---|---|---|---|---|---|
| AP 1 | 0.0 | 10.615363 | 15.514408 | 25.97075 | 30.96432 | 42.044225 |
| AP 2 | 10.615363 | 0.0 | 4.900543 | 15.356836 | 20.350888 | 31.434128 |
| AP 3 | 15.514408 | 4.900543 | 0.0 | 10.456547 | 15.450475 | 26.533709 |
| AP 4 | 25.97075 | 15.356836 | 10.456547 | 0.0 | 4.99418 | 16.080643 |
| AP 5 | 30.96432 | 20.350888 | 15.450475 | 4.99418 | 0.0 | 11.088048 |
| AP 6 | 42.044225 | 31.434128 | 26.533709 | 16.080643 | 11.088048 | 0.0 |

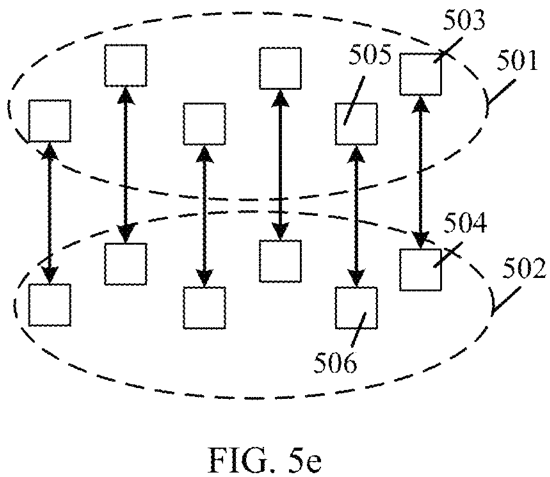

601: Obtain a bandwidth configuration scheme of a first AP group

602: When a similarity between a first physical topology corresponding to the first AP group and a second physical topology corresponding to a second AP group is greater than a similarity threshold, determine the bandwidth configuration scheme of the first AP group as a bandwidth configuration scheme of the second AP group

FIG. 6

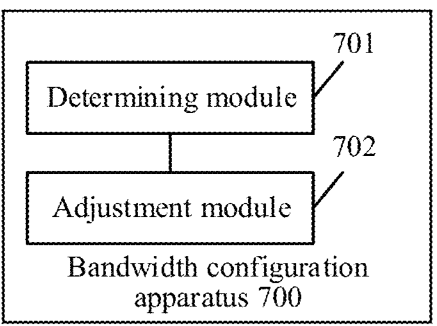

FIG. 7

BANDWIDTH CONFIGURATION METHOD AND RELATED DEVICE

CROSS-REFERENCE TO RELATED APPLICATIONS

This application is a continuation of International Application No. PCT/CN2022/142339, filed on Dec. 27, 2022, which claims priority to Chinese Patent Application No. 202210334477.8, filed on Mar. 31, 2022, and Chinese Patent Application No. 202210014285.9, filed on Jan. 4, 2022. All of the aforementioned patent applications are hereby incorporated by reference in their entireties.

TECHNICAL FIELD

This application relates to the communication field, and in particular, to a bandwidth configuration method and a related device.

BACKGROUND

With the rapid development of a wireless local area network (WLAN), access points (AP) are deployed more densely to meet network coverage requirements in scenarios such as campuses, enterprise campuses, automatic production workshops, and hospitals.

A plurality of APs in a coverage area may be referred to as an AP group. Any two APs included in an AP group may perform radio frequency signal scanning. A WLAN controller may obtain a neighbor relationship between APs in the AP group based on a result of the radio frequency scanning between the APs, and adjust a bandwidth configuration of the AP group based on the neighbor relationship between the APs. Obtaining the neighbor relationship between the APs based on the radio frequency signal scanning performed between the APs may be referred to as a neighbor scanning mechanism. Due to instability of the neighbor scanning mechanism (where, for example, the scanning result is affected by movement of a person or another factor during scanning), the neighbor relationship between the APs is sometimes missing and sometimes redundant. Consequently, bandwidth configuration results of the APs fluctuate in different degrees, and user network experience in the wireless network is affected.

SUMMARY

This application provides a bandwidth configuration method and a related device, to provide a stable bandwidth configuration result for an AP in a wireless network, and improve user network experience.

According to a first aspect, this application provides a bandwidth configuration method. The method may be applied to an electronic device. The electronic device is, for example, a WLAN controller, a computing device, or an AP. The electronic device determines bandwidth configuration schemes of N AP groups, and adjusts the bandwidth configuration scheme of the AP group based on a physical topology similarity between the AP groups. When physical topologies of two AP groups are similar, if bandwidths of two APs at corresponding physical locations in the two AP groups are different, a larger value of the bandwidths of the two APs is determined as the bandwidths of the two APs (which is referred to as a principle of a larger bandwidth). When a similarity between a first physical topology corresponding to a first AP group and a second physical topology corresponding to a second AP group is greater than a similarity threshold, and a bandwidth of a first AP in the first AP group is greater than a bandwidth of a second AP corresponding to the first AP in the second physical topology, the electronic device adjusts the bandwidth of the second AP in a bandwidth configuration scheme of the second AP group to the bandwidth of the first AP. When the similarity between the first physical topology and the second physical topology is greater than the similarity threshold, and the bandwidth of the first AP is less than the bandwidth of the second AP, the electronic device adjusts the bandwidth of the first AP in a bandwidth configuration scheme of the first AP group to the bandwidth of the second AP.

Each AP group includes a plurality of APs, and N is an integer greater than or equal to 2. The N AP groups include a first AP group and a second AP group. The first physical topology includes physical location information of a plurality of APs in the first AP group. The second physical topology includes physical location information of a plurality of APs in the second AP group.

In this solution, because a physical topology of an AP group is stable and not easy to change, a bandwidth configuration scheme of the AP group is adjusted based on a physical topology similarity between AP groups, so that stability of a bandwidth configuration result of the AP group can be effectively ensured, in other words, stability of a bandwidth configuration of the AP is ensured, thereby improving user network experience. In addition, a bandwidth configuration of the AP group is adjusted based on the principle of the larger bandwidth. This helps increase the network capacity of a wireless network and further improve the user network experience. In an embodiment, bandwidths of the plurality of APs in the first AP group are the same, and bandwidths of the plurality of APs in the second AP group are the same.

When the bandwidths of the plurality of APs in the first AP group are the same, and the bandwidths of the plurality of APs in the second AP group are the same, during bandwidth adjustment of the AP group, the bandwidth adjustment of the entire AP group may be completed by comparing two bandwidth values, and the bandwidths of the plurality of APs in the AP group do not need to be compared one by one, thereby improving bandwidth adjustment efficiency.

In an embodiment, the first physical topology further includes building structure information corresponding to a building on which the first AP group is installed, and the second physical topology further includes building structure information corresponding to a building on which the second AP group is installed.

In this solution, the physical topology includes not only physical location information of each AP in the AP group, but also building structure information of a building on which the AP group is installed. The building structure information is added as a basis for determining the physical topology similarity, so that precision of determining a physical topology similarity between two AP groups is improved, thereby helping adjust bandwidths of the AP groups more accurately.

In an embodiment, the electronic device determines the bandwidth configuration scheme of each AP group based on a neighbor relationship between the APs in each AP group.

In an embodiment, the electronic device determines information about a geometric distance between every two APs in the AP group based on physical location information of the APs in the AP group. Then, the electronic device determines, based on the physical location information of the APs in the AP group and the information about the geometric distance between every two APs in the AP group, the physical topology corresponding to the AP group.

In an embodiment, the electronic device determines the similarity between the first physical topology and the second physical topology based on AP information of the first physical topology and AP information of the second physical topology. The AP information includes a geometric distance between APs and information about a mutual location between the APs.

In an embodiment, the electronic device divides the first physical topology into a plurality of first sub-topologies, and divides the second physical topology into a plurality of second sub-topologies. Then, the electronic device determines isomorphic sub-topologies based on the plurality of first sub-topologies and the plurality of second sub-topologies. The electronic device determines the similarity between the first physical topology and the second physical topology based on a quantity or a proportion of the isomorphic sub-topologies.

In an embodiment, the electronic device determines, based on a geometric distance difference between corresponding edges between a pair of sub-topologies, whether a first sub-topology and a second sub-topology in the pair of sub-topologies are isomorphic sub-topologies. The first physical topology includes the first sub-topology, and the second physical topology includes the second sub-topology.

According to a second aspect, this application provides a bandwidth configuration method. The method may be applied to an electronic device. The electronic device is, for example, a WLAN controller, a computing device, or an AP. The electronic device first obtains a bandwidth configuration scheme of a first AP group. When a similarity between a first physical topology corresponding to the first AP group and a second physical topology corresponding to a second AP group is greater than a similarity threshold, the electronic device determines the bandwidth configuration scheme of the first AP group as a bandwidth configuration scheme of the second AP group.

The first AP group and the second AP group each include a plurality of APs. The first physical topology includes physical location information of the plurality of APs in the first AP group. The second physical topology includes physical location information of the plurality of APs in the second AP group.

In this solution, because a physical topology of an AP group is stable and not easy to change, a bandwidth configuration scheme of the AP group can be migrated based only on the physical topology similarity between the AP groups, so that not only bandwidth configuration efficiency of the AP group can be effectively improved, but also stability of a bandwidth configuration result of the AP group can be ensured, in other words, stability of a bandwidth configuration of the AP is ensured.

In an embodiment, the first physical topology further includes building structure information corresponding to a building on which the first AP group is installed, and the second physical topology further includes building structure information corresponding to a building on which the second AP group is installed.

In this solution, the building structure information is added as a basis for determining the physical topology similarity, so that precision of determining a physical topology similarity between two AP groups is improved, thereby helping adjust bandwidths of the AP groups more accurately.

In an embodiment, the electronic device determines the bandwidth configuration scheme of the first AP group based on a neighbor relationship between the APs in the first AP group.

In an embodiment, the electronic device determines information about a geometric distance between every two APs in the AP group based on physical location information of the APs in the AP group. Then, the electronic device determines, based on the physical location information of the APs in the AP group and the information about the geometric distance between every two APs in the AP group, the physical topology corresponding to the AP group.

In an embodiment, the electronic device determines the similarity between the first physical topology and the second physical topology based on AP information of the first physical topology and AP information of the second physical topology. The AP information includes a geometric distance between APs and information about a mutual location between the APs.

In an embodiment, the electronic device divides the first physical topology into a plurality of first sub-topologies, and divides the second physical topology into a plurality of second sub-topologies. Then, the electronic device determines isomorphic sub-topologies based on the plurality of first sub-topologies and the plurality of second sub-topologies. The electronic device determines the similarity between the first physical topology and the second physical topology based on a quantity or a proportion of the isomorphic sub-topologies.

According to a third aspect, this application provides a bandwidth configuration apparatus. The apparatus includes a determining module and an adjustment module.

The determining module is configured to determine bandwidth configuration schemes of N AP groups. Each AP group includes a plurality of APs, the bandwidth configuration scheme of each AP group includes a bandwidth of each AP in the plurality of APs in each AP group, and N is an integer greater than or equal to 2.

The adjustment module is configured to adjust the bandwidth configuration scheme of the AP group based on a physical topology similarity between the AP groups. When a similarity between a first physical topology corresponding to a first AP group and a second physical topology corresponding to a second AP group is greater than a similarity threshold, and a bandwidth of a first AP in the first AP group is greater than a bandwidth of a second AP corresponding to the first AP in the second physical topology, the adjustment module adjusts the bandwidth of the second AP in a bandwidth configuration scheme of the second AP group to the bandwidth of the first AP. When the similarity between the first physical topology and the second physical topology is greater than the similarity threshold, and the bandwidth of the first AP is less than the bandwidth of the second AP, the adjustment module adjusts the bandwidth of the first AP in a bandwidth configuration scheme of the first AP group to the bandwidth of the second AP.

The N AP groups include the first AP group and the second AP group. The first physical topology includes physical location information of a plurality of APs in the first AP group, and the second physical topology includes physical location information of a plurality of APs in the second AP group.

In an embodiment, bandwidths of the plurality of APs in the first AP group are the same, and bandwidths of the plurality of APs in the second AP group are the same.

In an embodiment, the first physical topology further includes building structure information corresponding to a building on which the first AP group is installed, and the second physical topology further includes building structure information corresponding to a building on which the second AP group is installed.

In an embodiment, the determining module is configured to determine the bandwidth configuration scheme of each AP group based on a neighbor relationship between the APs in each AP group.

In an embodiment, the determining module is further configured to:

- determine information about a geometric distance between every two APs in the AP group based on physical location information of the APs in the AP group; and
- determine, based on the physical location information of the APs in the AP group and the information about the geometric distance between every two APs in the AP group, a physical topology corresponding to the AP group.

In an embodiment, the adjustment module is further configured to:

- determine the similarity between the first physical topology and the second physical topology based on AP information of the first physical topology and AP information of the second physical topology, where the AP information includes a geometric distance between APs and information about a mutual location between the APs.

In an embodiment, the adjustment module is further configured to:

- divide the first physical topology into a plurality of first sub-topologies, and divide the second physical topology into a plurality of second sub-topologies;
- determine isomorphic sub-topologies based on the plurality of first sub-topologies and the plurality of second sub-topologies; and
- determine the similarity between the first physical topology and the second physical topology based on a quantity or a proportion of the isomorphic sub-topologies.

According to a fourth aspect, this application provides a bandwidth configuration apparatus. The apparatus includes an obtaining module and a determining module.

The obtaining module is configured to obtain a bandwidth configuration scheme of a first AP group.

The determining module is configured to: when a similarity between a first physical topology corresponding to the first AP group and a second physical topology corresponding to a second AP group is greater than a similarity threshold, determine the bandwidth configuration scheme of the first AP group as a bandwidth configuration scheme of the second AP group.

The first AP group and the second AP group each include a plurality of APs. The first physical topology includes physical location information of the plurality of APs in the first AP group, and the second physical topology includes physical location information of the plurality of APs in the second AP group.

In an embodiment, the first physical topology further includes building structure information corresponding to a building on which the first AP group is installed, and the second physical topology further includes building structure information corresponding to a building on which the second AP group is installed.

In an embodiment, the obtaining module is configured to determine the bandwidth configuration scheme of the first AP group based on a neighbor relationship between the APs in the first AP group.

In an embodiment, the determining module is further configured to:

- determine information about a geometric distance between every two APs in the AP group based on physical location information of the APs in the AP group; and
- determine, based on the physical location information of the APs in the AP group and the information about the geometric distance between every two APs in the AP group, the physical topology corresponding to the AP group.

In an embodiment, the determining module is further configured to:

- determine the similarity between the first physical topology and the second physical topology based on AP information of the first physical topology and AP information of the second physical topology, where the AP information includes a geometric distance between APs and information about a mutual location between the APs.

In an embodiment, the determining module is further configured to:

- divide the first physical topology into a plurality of first sub-topologies, and divide the second physical topology into a plurality of second sub-topologies;
- determine isomorphic sub-topologies based on the plurality of first sub-topologies and the plurality of second sub-topologies; and
- determine the similarity between the first physical topology and the second physical topology based on a quantity or a proportion of the isomorphic sub-topologies.

According to a fifth aspect, this application further provides a bandwidth configuration device, including a processor and a memory.

The memory is configured to store instructions or a computer program.

The processor is configured to execute the instructions or the computer program, to enable the bandwidth configuration device to perform the bandwidth configuration method provided in any one of the first aspect or the possible implementations of the first aspect, or the bandwidth configuration method provided in any one of the second aspect or the possible implementations of the second aspect.

According to a sixth aspect, this application further provides a computer-readable storage medium. The computer-readable storage medium stores instructions, and when the instructions are executed by a processor, the bandwidth configuration method provided in any one of the first aspect or the possible implementations of the first aspect, or the bandwidth configuration method provided in any one of the second aspect or the possible implementations of the second aspect is implemented.

According to a seventh aspect, this application further provides a computer program product, including a computer program. When the computer program is executed by a processor, the bandwidth configuration method provided in any one of the first aspect or the possible implementations of the first aspect, or the bandwidth configuration method provided in any one of the second aspect or the possible implementations of the second aspect is implemented.

BRIEF DESCRIPTION OF DRAWINGS

FIG. 5*e* is a schematic diagram of matched subgraphs according to an embodiment of this application;

FIG. 6 is a schematic flowchart of another bandwidth configuration method according to an embodiment of this application;

FIG. 7 is a schematic diagram of a structure of a bandwidth configuration apparatus according to an embodiment of this application;

DESCRIPTION OF EMBODIMENTS

For ease of understanding, the following first describes related terms used in embodiments of this application.

(1) Access point (AP)

An access point, also referred to as a wireless access point, is an access device of a wireless network. The access point is mainly used in areas such as homes, buildings, campuses, warehouses, and factories, and has typical distance coverage ranging from dozens of meters to hundreds of meters. The access point may also be used for long-distance transmission, and a maximum distance is about 30 km. The main technology is IEEE802.11 series. In addition, the access point may also have an access point client (AP client) mode, and may be wirelessly connected to another AP to expand coverage of the wireless network.

(2) AP group

Two or more APs form an AP group. For example, a building includes 10 floors, and each floor has 10 APs. Assuming that the APs on each floor form one AP group, the building has 10 AP groups accordingly.

(3) Bandwidth of an AP

The bandwidth of the AP is the frequency width of an operating channel of the AP. The unit of the bandwidth of the AP is, for example, megahertz (M).

(4) WLAN controller

The WLAN controller is a network device, and is responsible for managing an AP in a wireless network in an area. Management of the WLAN controller on the AP includes configuration management, radio management, access security control, and the like. For example, a WLAN controller is disposed in a building, and the WLAN controller is configured to manage all APs in the building. For another example, a WLAN controller may be disposed on each floor of a building, and the WLAN controller is configured to manage an AP on the floor. The WLAN controller is, for example, an access controller (AC).

(5) Digital map

The digital map represents a physical location relationship between a plurality of APs in a WLAN system, and may include physical location information of each AP (for example, a coordinate location of the AP) and a geometric distance between the APs.

(6) Isomorphic subgraph

A graph is formed by a set of nodes and a set of edges between the nodes, and is usually represented as G (V, E). G represents a graph, V is a set of nodes in the graph G, and E is a set of edges in the graph G. For example, a graph includes four nodes A, B, C, and D, and edges between the four nodes. A subgraph of a graph is a graph formed by a subset of a node set of the graph and a subset of an edge set of the graph.

It is assumed that G1 and G2 are graphs, and S1 and S2 are subgraphs of G1 and G2 respectively. If S1 and S2 meet an isomorphic subgraph condition, the condition is called subgraph isomorphism. The isomorphic subgraph condition may be set based on an actual situation. For example, S1 and S2 are called a group of isomorphic subgraphs of the graphs G1 and G2.

Figure 1A:
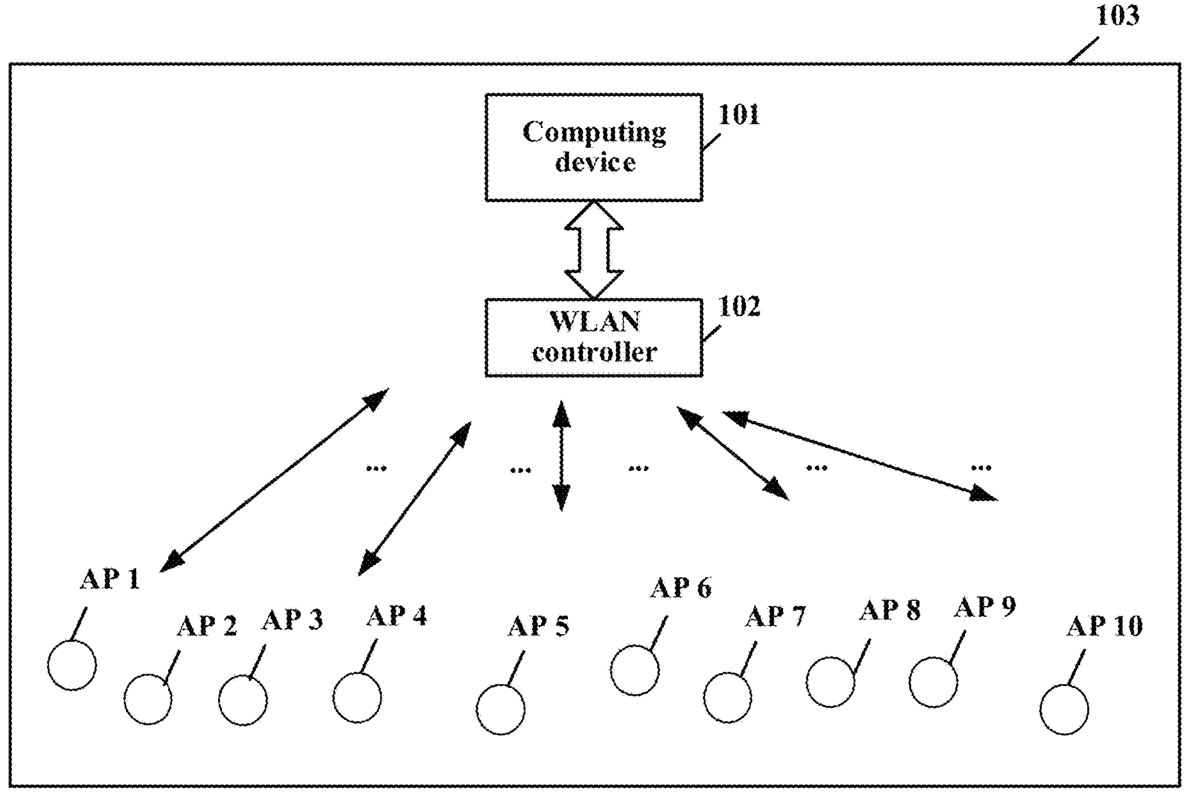
FIG. 1*a* is a schematic diagram of a system architecture according to an embodiment of this application.

The following describes technical solutions of this application with reference to accompanying drawings. Refer to FIG. 1*a*. FIG. 1*a* is a schematic diagram of a system architecture provided in an embodiment of this application. In FIG. 1*a,* a wireless network 103 includes a WLAN controller 102 and a plurality of APs, for example, an AP 1 to an AP 10. The WLAN controller 102 is configured to manage the plurality of APs, for example, determine bandwidth configurations of the plurality of APs, and indicate each AP to work based on the bandwidth configuration.

In an embodiment, the wireless network 103 may further include a computing device 101. When the wireless network 103 includes the computing device 101, the computing device 101 is configured to determine the bandwidth configurations of the plurality of APs, and send the bandwidth configurations to corresponding APs by using the WLAN controller 102, so that the APs work based on the bandwidth configurations. The computing device 101 is a device having a computing capability, for example, a personal computer, a server, a server cluster, a virtual machine, a virtual machine cluster, or a cloud device. For example, a cloud is a public cloud, a private cloud, or a hybrid cloud.

When the wireless network 103 includes a plurality of WLAN controllers, each WLAN controller may manage a part of the APs in the wireless network 103. For example, the wireless network 103 includes five WLAN controllers, and each WLAN controller manages two APs. The plurality of WLAN controllers may respectively determine bandwidth configuration schemes for the APs managed by the plurality of WLAN controllers, and indicate the APs managed by the plurality of WLAN controllers to work based on bandwidth configurations. When the wireless network 103 includes the computing device 101, each of the plurality of WLAN controllers may receive bandwidth configurations that are sent by the computing device 101 and that are for APs managed by the WLAN controller, and send the bandwidth configurations to the corresponding APs.

Any two APs included in an AP group may perform radio frequency signal scanning. A WLAN controller may obtain a neighbor relationship between APs in the AP group based on a result of the radio frequency scanning between the APs, and adjust a bandwidth configuration of the AP group based on the neighbor relationship between the APs. Obtaining the neighbor relationship between the APs based on the radio frequency signal scanning performed between the APs may be referred to as a neighbor scanning mechanism. Due to instability of the neighbor scanning mechanism (where, for example, the scanning result is affected by movement of a person or another factor during scanning), the neighbor relationship between the APs is sometimes missing and sometimes redundant. Consequently, bandwidth configuration results of the APs fluctuate in different degrees. For example, the bandwidth configuration result of each AP is sometimes 40 M and sometimes 80 M. This causes instability of the bandwidth configuration. In addition, the instability may cause an AP that can be originally configured with 80 M to be configured with 40 M. As a result, the capacity of the AP and a wireless network in which the AP is located is reduced, and user network experience in the wireless network is affected.

Based on this, this application provides a bandwidth configuration method. In the method, based on a physical topology similarity between two AP groups, bandwidth configurations of APs in the two AP groups are adjusted. When a physical topology of a first AP group is similar to a physical topology of a second AP group, a bandwidth of an AP in the first AP group is a larger value of the bandwidth of the AP and a bandwidth of an AP that corresponds to the AP and that is in the second AP group, and a bandwidth of an AP in the second AP group is a larger value of the bandwidth of the AP and a bandwidth of an AP that corresponds to the AP and that is in the first AP group. In other words, when physical topologies of two AP groups are similar, if bandwidths of two APs at corresponding physical locations in the two AP groups are different, a larger value of the bandwidths of the two APs is determined as the bandwidths of the two APs (which is referred to as a principle of a larger bandwidth). A physical location of an AP generally seldom changes, in other words, a physical topology of an AP group is stable. Therefore, the physical topology similarity between the two AP groups is also stable. The bandwidth of the AP in the AP group is adjusted based on the physical topology similarity between the AP groups, so that the bandwidth of the AP can be more stable. Further, during bandwidth adjustment, the bandwidth of the AP is adjusted based on the principle of the larger bandwidth, so that the network capacity of a wireless network can be effectively improved, thereby improving the user network experience.

In addition, in this application, bandwidth configuration schemes of the AP groups can be migrated based on the physical topology similarity between the AP groups For example, if bandwidth configuration schemes of a plurality of APs in a first building are known, when a physical topology of a plurality of APs in a second building is similar to a physical topology of the plurality of APs in the first building, the bandwidth configuration schemes of the plurality of APs in the first building may be directly applied to the plurality of APs in the second building. In this way, bandwidth configuration efficiency of APs can be effectively improved.

The bandwidth configuration method in this application may be performed by an electronic device, and the electronic device is, for example, a WLAN controller, a computing device, or an AP. The foregoing AP may be understood as any AP in a wireless network to which the bandwidth configuration method is applied. The following describes the bandwidth configuration method in detail by using an example in which the electronic device is a computing device.

Figure 2:
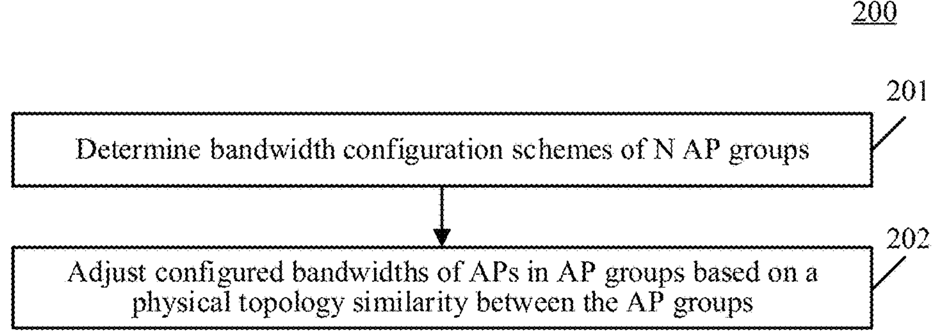
FIG. 2 is a schematic flowchart of a bandwidth configuration method according to an embodiment of this application.

Refer to FIG. 2. FIG. 2 is a schematic flowchart of a bandwidth configuration method according to an embodiment of this application. The bandwidth configuration method 200 includes operation 201 and operation 202.

201. Determine bandwidth configuration schemes of N AP groups.

APs in a wireless network within a preset range (where the preset range is, for example, a building or a floor) may be grouped into the N AP groups. Each AP group includes a plurality of APs, where "a plurality of" means "two or more". N is an integer greater than or equal to 2. In the N AP groups, quantities of APs in the AP groups may be the same or may be different.

For example, for a building, the building includes 10 floors, and 10 APs are deployed on each floor. If the APs on each floor form one AP group, the building has 10 AP groups accordingly.

For another example, for 10 rooms on a same floor, five APs are disposed in each room, and the APs in the same room may be grouped into one AP group. In this case, there are 10 AP groups on the same floor.

A bandwidth configuration scheme of an AP group includes a configured bandwidth of each AP in the AP group. Configured bandwidths of a plurality of APs in a same AP group may be the same or may be different. For a process of determining the configured bandwidth of each AP, refer to the following embodiment shown in FIG. 3. Details are not described herein again.

Figure 1B:
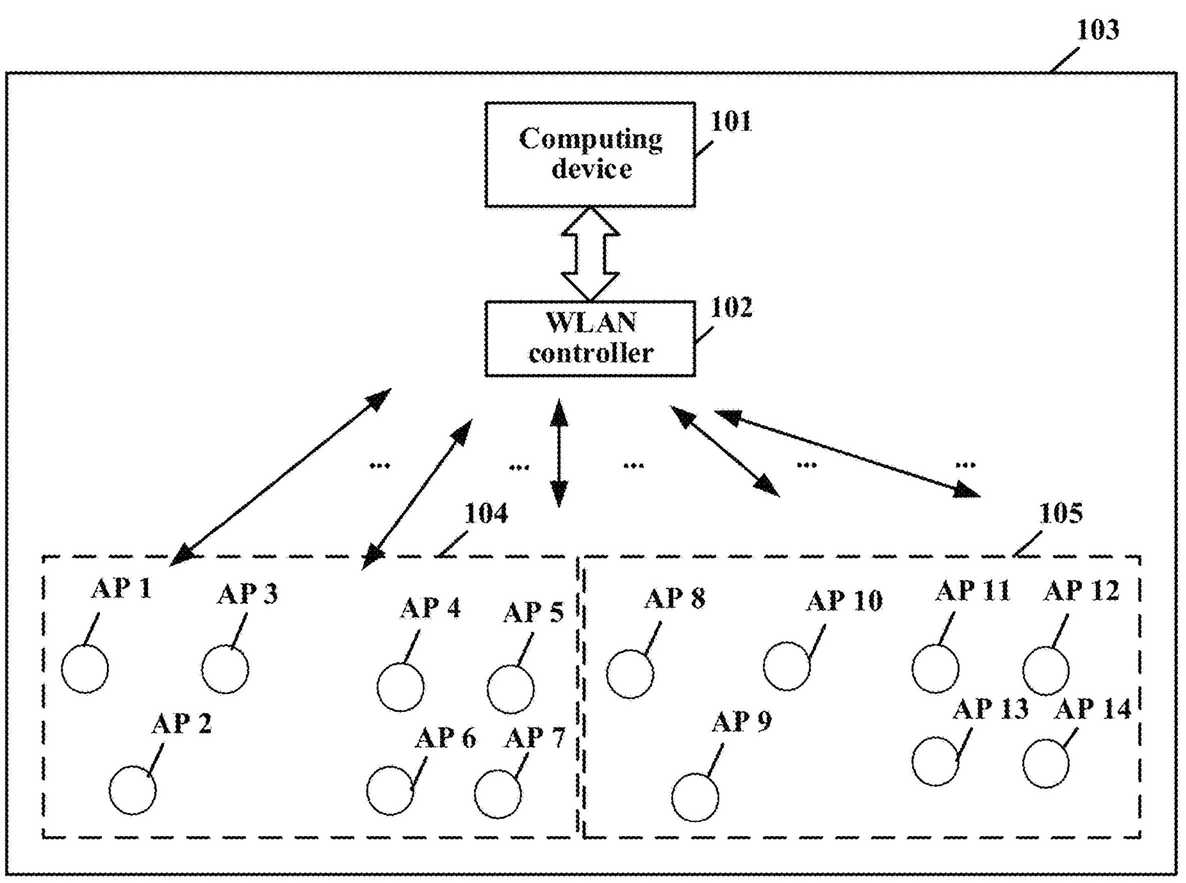
FIG. 1*b* is a schematic diagram of another system architecture according to an embodiment of this application.

Refer to FIG. 1*b*. FIG. 1*b* is a schematic diagram of another system architecture according to an embodiment of this application. Fourteen APs included in a wireless network 103 are grouped into two AP groups: a first AP group 104 and a second AP group 105. The first AP group 104 includes an AP 1, an AP 2, an AP 3, an AP 4, an AP 5, an AP 6, and an AP 7, and the second AP group 105 includes an AP 8, an AP 9, an AP 10, an AP 11, an AP 12, an AP 13, and an AP 14. It is assumed that configured bandwidths of the AP 1 to the AP 14 are shown in Table 1 or Table 2. In Table 1, configured bandwidths of APs in an AP group are not completely the same, but in Table 2, configured bandwidths of APs in a same AP group are the same.

TABLE 1

| AP number | AP 1 | AP 2 | AP 3 | AP 4 | AP 5 | AP 6 | AP 7 |
|---|---|---|---|---|---|---|---|
| Bandwidth/M | 80 | 80 | 80 | 20 | 20 | 20 | 20 |
| AP number | AP 8 | AP 9 | AP 10 | AP 11 | AP 12 | AP 13 | AP 14 |
| Bandwidth/M | 20 | 20 | 20 | 40 | 40 | 40 | 40 |

TABLE 2

| AP number | AP 1 | AP 2 | AP 3 | AP 4 | AP 5 | AP 6 | AP 7 |
|---|---|---|---|---|---|---|---|
| Bandwidth/M | 80 | 80 | 80 | 80 | 80 | 80 | 80 |
| AP number | AP 8 | AP 9 | AP 10 | AP 11 | AP 12 | AP 13 | AP 14 |
| Bandwidth/M | 20 | 20 | 20 | 20 | 20 | 20 | 20 |

202. Adjust configured bandwidths of APs in AP groups based on a physical topology similarity between the AP groups.

When a similarity between a first physical topology corresponding to a first AP group and a second physical topology corresponding to a second AP group is greater than a similarity threshold, and a bandwidth of a first AP in the first AP group is greater than a bandwidth of a second AP corresponding to the first AP in the second physical topology, the bandwidth of the second AP in a bandwidth configuration scheme of the second AP group is adjusted to the bandwidth of the first AP.

When the similarity between the first physical topology and the second physical topology is greater than the similarity threshold, and the bandwidth of the first AP is less than the bandwidth of the second AP, the bandwidth of the first AP in a bandwidth configuration scheme of the first AP group is adjusted to the bandwidth of the second AP.

In other words, when physical topologies of two AP groups are similar, if bandwidths of two APs at corresponding physical locations in the two AP groups are different, a larger value of the bandwidths of the two APs is determined as the bandwidths of the two APs (which is referred to as a principle of a larger bandwidth). The N AP groups include the first AP group and the second AP group, the first physical topology includes physical location information of the plurality of APs in the first AP group, and the second physical topology includes physical location information of the plurality of APs in the second AP group. For how to obtain a physical topology of an AP group, refer to the following embodiment shown in FIG. 4*a*. Details are not described herein.

A physical topology similarity between two AP groups includes similarities between physical topology structures of APs in the two AP groups. For how to obtain the similarity between the physical topology structures of the two AP groups, refer to the following embodiment shown in FIG. 5*a*. Details are not described herein. A value of the similarity threshold may be set based on an actual situation, and is not limited. The foregoing "second AP corresponding to the first AP" should be understood as that, for the first AP groups and the second AP group that meet the similarity threshold, a relative location of the first AP in the first AP group is the same as a relative location of the second AP in the second AP group. In other words, the second AP is an AP whose relative location in the second AP group is the same as a relative location of the first AP in the first AP group. Refer to FIG. 1*b*. For example, assuming that the first AP in the first AP group 104 is the AP 4, the corresponding second AP in the second AP group 105 is the AP 11. Assuming that the first AP is the AP 1, the corresponding AP is the AP 8.

For any two AP groups in the N AP groups, for example, the first AP group and the second AP group, when the similarity between the first physical topology corresponding to the first AP group and the second physical topology corresponding to the second AP group is greater than the similarity threshold, and the bandwidth of the first AP in the first AP group is greater than the bandwidth of the second AP corresponding to the first AP in the second physical topology, the bandwidth of the second AP in the bandwidth configuration scheme of the second AP group is adjusted to the bandwidth of the first AP.

Refer to FIG. 1*b* and Table 1. Assuming that the first AP is the AP 2 (with a bandwidth of 80 M), the second AP is the AP 9 (with a bandwidth of 20 M). In this case, the configured bandwidth of the AP 9 is adjusted to 80 M. Then, refer to FIG. 1*b* and Table 2. When the configured bandwidths of the APs in the AP group are the same, for the first AP group and the second AP group whose similarity is greater than the similarity threshold, comparison needs to be performed only once, to complete bandwidth adjustment. In an embodiment, the configured bandwidths of all the APs in the second AP group 105 are adjusted to 80 M. If configured bandwidths of all APs in a same AP group are the same, during bandwidth adjustment of the AP group, there is no need for one-by-one comparison and comparison needs to be performed only once. In addition, a larger value of two configured bandwidths is used as a configured bandwidth of an AP in an AP group whose configured bandwidth is a smaller value. This can improve bandwidth adjustment efficiency.

When the similarity between the first physical topology and the second physical topology is greater than the similarity threshold, and the bandwidth of the first AP is less than the bandwidth of the second AP, the bandwidth of the first AP in a bandwidth configuration scheme of the first AP group is adjusted to the bandwidth of the second AP. Refer to FIG. 1*b* and Table 1. Assuming that the first AP is the AP 4 (with a bandwidth of 20 M), the second AP is the AP 11 (with a bandwidth of 40 M). In this case, the configured bandwidth of the AP 4 is adjusted to 40 M.

When quantities of APs in the first AP group and the second AP group that meet a physical topology similarity requirement are different, if the quantity of the APs in the first AP group is S1, the quantity of the APs in the second AP group is S2, and S2 is greater than S1, during bandwidth configuration adjustment, S1 APs that are in the second AP group and that have highest physical topology similarities with the APs in the first AP group are first determined, and bandwidth adjustment may be performed for the foregoing S1 APs in the second AP group based on the principle of the larger bandwidth. However, a configured bandwidth of an AP other than the foregoing S1 APs in the second AP group may be determined based on a method for determining a bandwidth of an AP in a conventional technology, and is not limited. For example, the AP other than the foregoing S1 APs in the second AP group may continue to reserve a configured bandwidth determined in operation 201. For another example, when configured bandwidths of the APs in the second AP group are the same, for the AP other than the foregoing S1 APs in the second AP group, the configured bandwidth of the AP is consistent with configured bandwidths of the S1 APs in the second AP group. For another example, for the AP other than the foregoing S1 APs in the second AP group, the configured bandwidth of the AP may be actively reduced. The bandwidth of the AP may be reduced to a preset conservative bandwidth, to reduce impact of the AP on the bandwidths of the S1 APs. A value of the conservative bandwidth may be set based on an actual situation. For example, the conservative bandwidth is 20 M. Assuming that a bandwidth of an AP determined in operation 201 is 80 M, the bandwidth of the AP may be reduced to 20 M.

Further, each AP group may be further divided into a plurality of AP sub-groups. For example, K APs with a same bandwidth in the first AP group are grouped into a sub-group. If bandwidths of K Aps that are in the second AP group and that correspond to the K APs are also the same, the corresponding K APs in the second AP group are also grouped into a sub-group. When physical topologies of the AP groups are similar, physical topologies of corresponding AP sub-groups are also similar. In this case, bandwidths of all APs in two similar AP sub-groups may all be directly set to a larger value in the bandwidths of the two similar AP sub-groups. In this way, even if the bandwidths of the APs in the AP group are not completely the same, a bandwidth of each AP does not need to be compared one by one to adjust the bandwidth of each AP. Instead, the bandwidth of the AP may be adjusted sub-group by sub-group based on comparison of the AP sub-groups. This can improve bandwidth adjustment efficiency of the APs. For example, in FIG. 1*b* and Table 1, the AP 1, the AP 2, and the AP 3 are a first AP sub-group (where bandwidths of the APs in the sub-group are all 80 M), and the AP 8, the AP 9, and the AP 10 are a second AP sub-group (where bandwidths of the APs in the sub-group are all 20 M). When the first AP sub-group and the second AP sub-group are adjusted, bandwidth values need to be compared only once, so that bandwidth adjustment of the two AP sub-groups can be completed. In an embodiment, a configured bandwidth of the second AP sub-group is adjusted to 80 M. For another example, if bandwidths of the AP 1, the AP 2, and the AP 6 in the first AP group 104 in FIG. 1*b* are the same, and bandwidths of the AP 8, the AP 9, and the AP 13 that correspond to the three Aps and that are in the second AP group 105 are also the same, the AP 1, the AP 2, and the AP 6 may be grouped into a sub-group, and the AP 8, the AP 9, the AP 13 may be grouped into a sub-group, and then bandwidths of the two sub-groups are compared to simultaneously adjust a bandwidth of one sub-group.

In an embodiment of the application, an electronic device adjusts the bandwidth configuration scheme of the AP group based on the physical topology similarity between the AP groups. A physical location of the AP group is stable, and the physical topology of the AP group is stable and not easy to change. Therefore, the physical topology similarity between the AP groups is also stable and not easy to change. Therefore, the bandwidth configuration scheme of the AP group can be adjusted based on the physical topology similarity between the AP groups to ensure stability of the bandwidth configuration scheme of the AP group, in other words, to ensure stability of bandwidth configurations of APs in the AP group, so as to improve user network experience. In addition, a bandwidth configuration of the AP group is adjusted based on the principle of the larger bandwidth. This helps increase the network capacity of a wireless network and improve user network experience.

Figure 1C:
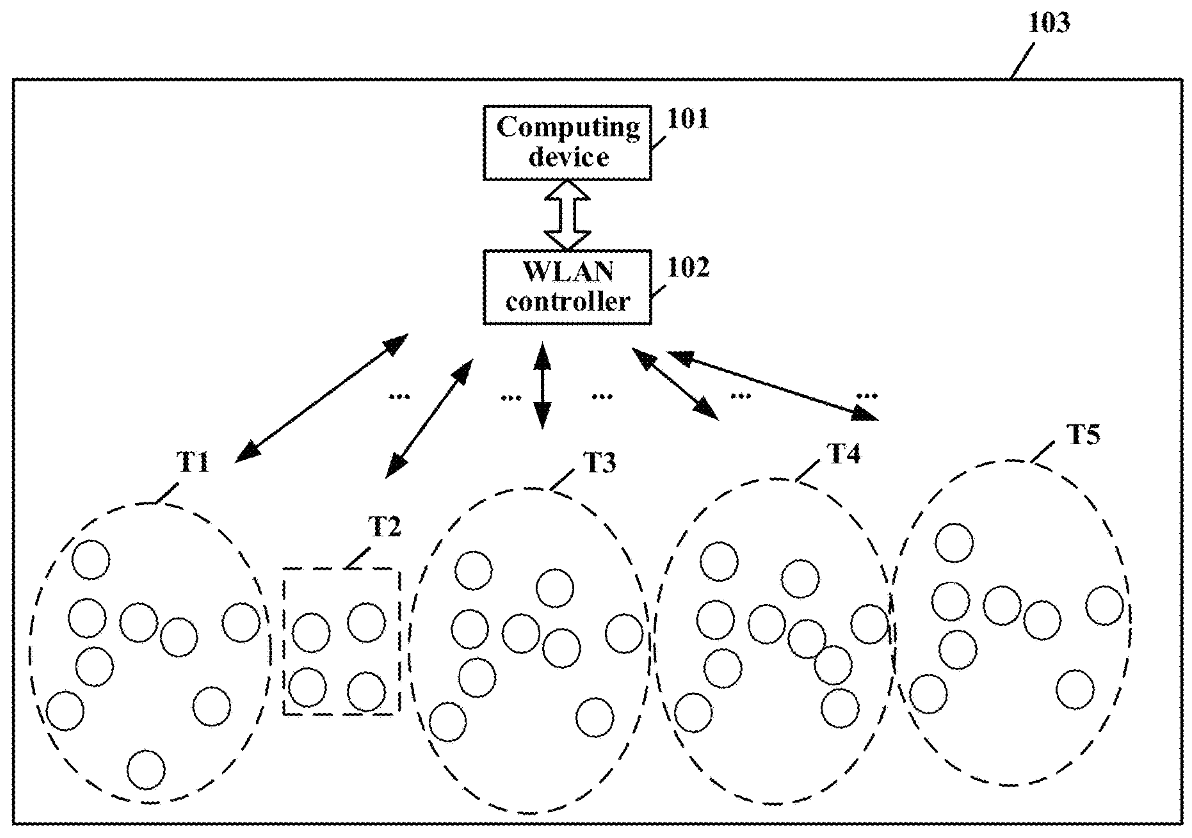
FIG. 1*c* is a schematic diagram of still another system architecture according to an embodiment of this application.

Refer to FIG. 1*c*. FIG. 1*c* is a schematic diagram of still another system architecture according to an embodiment of this application. Based on the bandwidth configuration method in embodiments of this application, a computing device 101 first groups 40 APs into five AP groups: a first AP group T1, a second AP group T2, a third AP group T3, a fourth AP group T4, and a fifth AP group T5. The first AP group T1 includes nine APs, the second AP group T2 includes four APs, the third AP group T3 includes nine APs, the fourth AP group T4 includes 10 APs, and the fifth AP group T5 includes eight APs. After preliminarily determining bandwidth configuration schemes of the foregoing five AP groups, the computing device 101 adjusts configured bandwidths of the AP group based on a physical topology similarity between the AP groups. For example, bandwidths of APs in a same AP group are the same. Refer to FIG. 1*c*. It is assumed that bandwidths configured by the computing device 101 for the first AP group T1, the third AP group T3, and the fourth AP group T4 are 80 M, and bandwidths configured for the second AP group T2 and the fifth AP group T5 are 40 M. When a similarity between a third physical topology corresponding to the third AP group T3 and a fifth physical topology corresponding to the fifth AP group T5 is greater than a similarity threshold, the configured bandwidth of the fifth AP group T5 is adjusted from 40 M to 80 M.

For an AP group, an electronic device may determine a bandwidth configuration scheme for the AP group based on a neighbor relationship between APs in the AP group, to obtain bandwidth configuration schemes of N AP groups.

A bandwidth of an AP depends on a channel bandwidth used by the AP. For example, when the AP uses a channel 36, the bandwidth of the AP is 20 M. When the AP uses a channel 46, the bandwidth of the AP is 40 M. However, the quantity of channels is limited. For example, there are only three available channels (a channel 42, a channel 58, and a channel 155) of 80 M, and there are six available channels (a channel 38, a channel 46, a channel 54, a channel 62, a channel 151, and a channel 159) corresponding to 40 M, and 13 available channels (a channel 36, a channel 40, a channel 44, a channel 48, a channel 52, a channel 56, a channel 60, a channel 64, a channel 149, a channel 153, a channel 157, a channel 161, and a channel 165) corresponding to 20 M. If all the APs in the AP group are configured with a high bandwidth (for example, 80 M), severe co-channel interference may occur. Therefore, a bandwidth that can be configured for the AP may be determined based on the neighbor relationship between the APs. For example, a high bandwidth is configured for an AP with a small quantity of neighbors in an AP group, and a low bandwidth is configured for an AP with a large quantity of neighbors in the AP group. In addition, neighboring APs in the AP group are prevented from using a same channel as far as possible. In this way, a bandwidth configuration scheme of the AP group is obtained. For another example, the electronic device may further count the quantity of neighboring APs of each AP in the AP group, and then configure a same bandwidth for the APs in the AP group based on a statistical value of the quantity of neighboring APs. For details, refer to the following embodiment shown in FIG. 3.

The electronic device may determine, based on a result of radio frequency signal detection between the APs, whether the APs have a neighbor relationship.

In an example, the electronic device determines the neighbor relationship between the APs based on a signal strength between the APs. The higher a signal strength between two APs, the closer a neighbor relationship between the two APs. When the signal strength between the two APs is greater than a signal strength threshold, it may be determined that the two APs are neighboring APs of each other. The signal strength between the APs may be a received signal strength. A value of the signal strength threshold may be set based on an actual situation.

In another example, the electronic device may determine the neighbor relationship between the APs based on a delay between the two APs. For example, when the delay between the two APs is less than a delay threshold, it is determined that the two APs are neighboring APs of each other.

In still another example, the electronic device may determine the neighbor relationship between the APs based on whether there is signal exchange between the two APs. For example, when there is the signal exchange between the two APs, it is determined that the two APs are neighboring APs of each other. If the AP 1 can receive signals from the AP 2, the AP 2 is a neighbor of the AP 1. If the AP 1 and the AP 2 sense signals from each other, the AP 1 and the AP 2 are neighbors of each other.

In still another example, when a terminal roams between the AP 1 and the AP 2, the electronic device may determine that the AP 1 and the AP 2 have a neighbor relationship.

Figure 3:
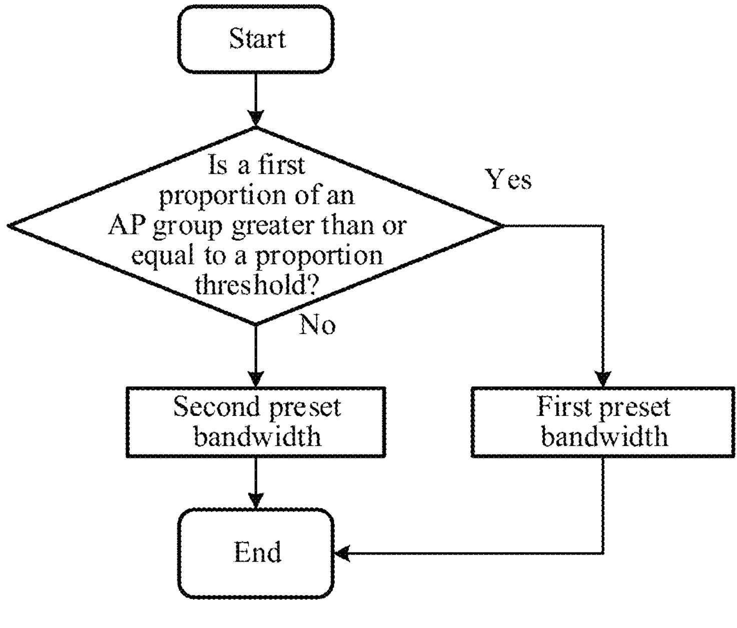
FIG. 3 is a schematic flowchart of determining a bandwidth configuration scheme of an AP group according to an embodiment of this application.

Refer to FIG. 3. FIG. 3 is a schematic flowchart of a method for determining a bandwidth configuration scheme of an AP group according to an embodiment of this application.

In this method, when a first proportion of the AP group is greater than or equal to a proportion threshold, it is determined that configured bandwidths of the AP group are a first preset bandwidth. When the first proportion of the AP group is less than the proportion threshold, it is determined that the configured bandwidths of the AP group are a second preset bandwidth. The first preset bandwidth is greater than the second preset bandwidth.

The first proportion is a ratio of a quantity of APs that meet a first condition in the AP group to a total quantity of APs in the AP group, and the first condition is that a quantity of in-group neighbors of an AP is less than or equal to a first quantity threshold. The first quantity threshold may be determined based on the first preset bandwidth. If a quantity of available channels of the first preset bandwidth is L, the first quantity threshold is (L−1). For example, the first preset bandwidth is 80 M (where the quantity of available channels is 3), the second preset bandwidth is 40 M or 20 M, L=3, and the first quantity threshold is 2. For another example, the first preset bandwidth is 40 M (where the quantity of available channels is 6), the second preset bandwidth is 20 M, L=6, and the first quantity threshold is 5. The proportion threshold may be set based on a requirement, for example, 75%. The quantity of in-group neighbors of the AP refers to the quantity of APs in the AP group that have neighbor relationships with the AP.

In an embodiment, when a quantity of neighbors of APs accounting for a proportion (which is, for example, greater than the proportion threshold) of an AP group is less than or equal to a quantity of available channels of a bandwidth, bandwidths of all APs in the AP group may be configured as the bandwidth.

In an embodiment, the first condition may further include that the quantity of out-group neighbors of the AP is less than or equal to a second quantity threshold. For example, the second quantity threshold is also L−1. The quantity of out-group neighbors of the AP refers to a quantity of APs outside the AP group that have neighbor relationships with the AP.

For each AP group, processing operations in FIG. 3 are performed, to determine a bandwidth configuration scheme of each AP group, so as to determine configuration schemes of N AP groups. For example, configured bandwidths of N1 AP groups are 80 M, configured bandwidths of N2 AP groups are 40 M, and configured bandwidths of N3 AP groups are 20 M, where N=N1+N2+N3.

Figure 4A:
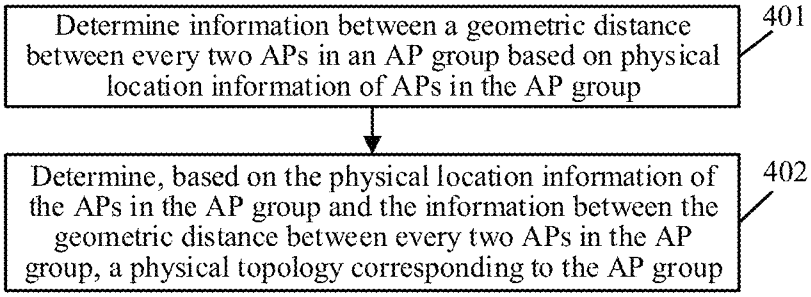
FIG. 4*a* is a schematic flowchart of a method for determining a physical topology of an AP group according to an embodiment of this application.

FIG. 4*a* is a schematic flowchart of a method for determining a physical topology of an AP group according to an embodiment of this application. The method may be applied to an electronic device. The electronic device is, for example, a WLAN controller, a computing device, or an AP. Refer to FIG. 4*a*. The method includes operation 401 and operation 402.

401. Determine information about a geometric distance between every two APs in an AP group based on physical location information of APs in the AP group.

In an example, the physical location information of the AP may be the longitude, the latitude, and the height or X-Y-Z coordinate information that is of the AP in a preset coordinate system and that is measured by a measurement person. For example, the measurement person measures the physical location information of the AP based on a laser ranging technology. The preset coordinate system may be a coordinate system that uses any point in an area in which the AP is located as an origin.

In another example, the physical location information of the AP is obtained based on a network planning file. The network planning file includes coordinate information of the AP and information about the AP, for example, an identifier of the AP.

In another example, the physical location information of the AP is determined based on a digital map that includes the coordinate information of the AP. The digital map may be obtained in the following manner: A digital map construction apparatus selects a topology area on which bandwidth configuration needs to be performed, and divides the topology area into buildings, such as an office building, an apartment building, and a teaching building. The digital map construction apparatus imports a point map (for example, a building engineering drawing) into a building interface as a background image. The point map is an image with the size of S1*S2, and S1 and S2 are respectively maximum values of X and Y coordinates of the APs. The digital map construction apparatus places the identifier of the AP in the point map in an automatic deployment manner, or manually places the identifier of the AP in the point map. Finally, the digital map construction apparatus exports topology area planning information of the AP in a form of an xlsx file, and obtains X-axis and Y-axis coordinates corresponding to the AP, where the coordinates are pixel coordinates of a point of the AP relative to a coordinate origin. The digital map construction apparatus may add corresponding Z-axis information (for example, the height of a building) to the xlsx file as height information, to obtain the digital map of the AP. The digital map construction apparatus is, for example, the foregoing electronic device.

After obtaining the physical location information of the APs in the AP group, the electronic device determines the information about the geometric distance between every two APs in the AP group based on the physical location information of the APs in the AP group. A geometric distance may be calculated by using the Euclidean distance calculation formula. When the preset coordinate system is an earth coordinate system, when the information about the geometric distance is calculated based on physical location information of the APs in the earth coordinate system, an obtained geometric distance is a real distance between two APs. When the information about the geometric distance is calculated based on physical location information of the APs in a relative coordinate system (for example, location coordinate information of the APs obtained based on the network planning file or the digital map), when a scale is known (where, for example, the scale is 1:100), a calculation result may be converted based on the scale to obtain the real distance. Otherwise, the obtained geometric distance is a relative distance.

402. Determine, based on the physical location information of the APs in the AP group and the information about the geometric distance between every two APs in the AP group, a physical topology corresponding to the AP group.

In an embodiment, the electronic device may generate, based on the physical location information of each AP in the AP group and the information about the geometric distance between every two APs in the AP group, the physical topology corresponding to the AP group. The physical topology of the AP group includes the physical location information of each AP in the AP group and the information about the geometric distance between every two APs in the AP group.

Figures 4B, 4C:
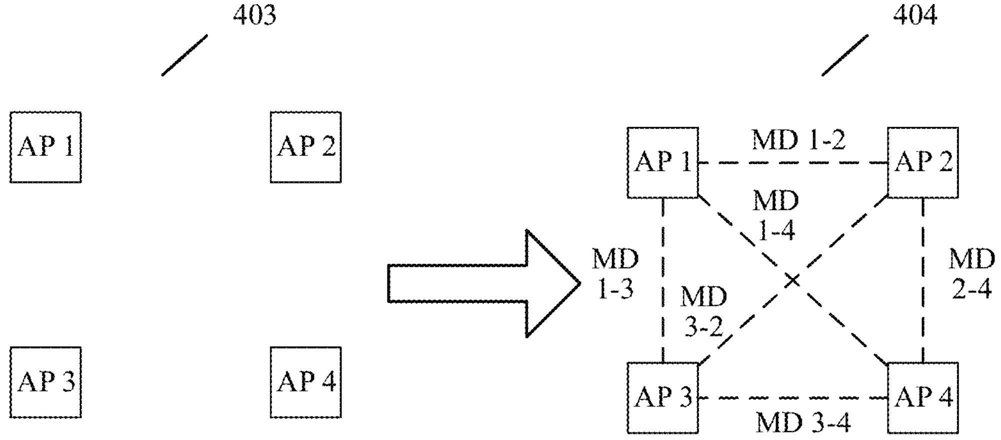
FIG. 4*b* is a schematic diagram of a physical topology of an AP group according to an embodiment of this application.
FIG. 4*c* is a schematic diagram of geometric distances between APs in the AP group in FIG. 4*b;*

Refer to FIG. 4*b* and FIG. 4*c*. FIG. 4*b* is a schematic diagram of a physical topology of an AP group according to an embodiment of this application. FIG. 4*c* is a schematic diagram of geometric distances between APs in the AP group in FIG. 4*b*. For example, an AP group includes an AP 1, an AP 2, an AP 3, and an AP 4, and a digital map 403 corresponding to the AP group includes physical location information ($x_i$, $y_i$, $Z_i$) of the AP 1, the AP 2, the AP 3, and the AP 4. The electronic device calculates a geometric distance MD i–j (where MD i–j represents a relative distance from an AP i to an AP j) between every two APs based on a Euclidean distance calculation formula and the physical location information of the APs. For values of geometric distances corresponding to the digital map 403, refer to the schematic diagram of the geometric distances shown in FIG. 4*c*. The electronic device may generate, based on the physical location information of each AP in the AP group and the geometric distance between every two APs in the AP group, a physical topology 404 corresponding to the digital map 403.

After determining the physical topology of each AP group, the electronic device may calculate a physical topology similarity between every two AP groups. For a first physical topology corresponding to a first AP group and a second physical topology corresponding to a second AP group, the electronic device may determine a similarity between the first physical topology and the second physical topology based on AP information of the first physical topology and AP information of the second physical topology, where the AP information includes a distance between the APs and information about a mutual location between the APs.

The distance between the APs in the AP group is the geometric distance between every two APs in the AP group. The information about the mutual location between the APs is a location relationship between the APs in the AP group. The electronic device may determine the information about the mutual location between the APs in the AP group by using any point in an area in which the AP group is located as a reference point. Refer to FIG. 4*b*. When determining information about a mutual location between APs in the AP group formed by the AP 1 to the AP 4, the electronic device may use the AP 1 as an origin. In this case, the information about the mutual location between the APs in the AP group in FIG. 4*b* is that the AP 2 is located in a positive horizontal direction of the AP 1, the AP 3 is located in a direction of negative 90 degrees of the AP 1, and the AP 4 is located in a direction of negative 45 degrees of the AP 1.

In an example, the electronic device determines a similarity between two physical topologies by using a difference between information about mutual locations between APs in the two physical topologies and a difference between geometric distances between APs in the two physical topologies. To more accurately obtain the difference between the information about the mutual locations between the APs in the two physical topologies, the electronic device may unify the location information of the APs in the two physical topologies to a reference point. For example, an AP×1 in the first physical topology is used as the reference point (where for example, both X-axis and Y-axis coordinates of the AP×1 are changed to 0), and location information of other APs (for example, an AP×2, an AP×3, and an AP×4) in the first physical topology is adjusted, to keep a mutual location relationship between the APs in the first physical topology and a geometric distance between the APs unchanged. In this way, new location information of each AP in the first physical topology can be obtained. Both X-axis and Y-axis coordinates of an AP (for example, an AP y1) in the second physical topology are changed to 0, and location information of other APs (for example, an AP y2, an AP y3, and an AP y4) in the second physical topology is adjusted, to keep a mutual location relationship between the APs in the second physical topology and a geometric distance between the APs unchanged. In this way, new location information of each AP in the second physical topology can be obtained. In this case, the AP×1 in the first physical topology and the AP y1 in the second physical topology are APs with corresponding locations, and the electronic device may determine, based on location information of the other APs in the first physical topology relative to the AP×1 and a location relationship of the other APs in the second physical topology relative to the AP y1, APs that are in the second physical topology and that correspond to the other APs in the first physical topology. The electronic device may calculate a geometric distance between every two APs with corresponding locations in the first physical topology and the second physical topology, to obtain a location difference between the two APs. The electronic device accumulates a location difference between each AP in the first physical topology and a corresponding AP, to obtain a relative location difference between the APs in the two physical topologies. The electronic device may calculate a geometric distance difference between two edges with corresponding locations in the first physical topology and the second physical topology, and accumulate geometric distance differences between all edges in the first physical topology and corresponding edges, to obtain a geometric distance difference between the APs in the two physical topologies. The electronic device uses the foregoing two differences as a similarity between the first physical topology and the second physical topology, and compares the similarity with a threshold, to determine the similarity between the two physical topologies. For example, when the relative location difference between the APs in the two physical topologies is less than a location difference threshold, and the geometric distance difference between the APs in the two physical topologies is less than a geometric distance difference threshold, the electronic device determines that the similarity between the first physical topology and the second physical topology is greater than the similarity threshold, to determine that the first physical topology is similar to the second physical topology. The electronic device may alternatively perform weighted summation on the foregoing two differences to obtain the similarity between the first physical topology and the second physical topology, and when the similarity is greater than the similarity threshold, determine that the first physical topology is similar to the second physical topology.

Values of the location difference threshold, the geometric distance difference threshold, and the similarity threshold may be set based on an actual situation, and are not limited.

The second physical topology adjusted by using the AP y1 as a reference point may not be similar to the first physical topology adjusted by using the AP×1 as a reference. The electronic device may further adjust the second physical topology based on the foregoing method by using another AP in the second physical topology as the reference in turn, and determine a similarity between the adjusted second physical topology and the adjusted first physical topology. When an AP exists in the second physical topology, so that the adjusted second physical topology is similar to the adjusted first physical topology, it is determined that the first physical topology is similar to the second physical topology.

When two physical topologies include different quantities of APs, the physical topology with a smaller quantity of APs may be used as the first physical topology, and a same quantity of APs as in the first physical topology is selected from the physical topology with a larger quantity of APs, to form the second physical topology. Then, the electronic device determines the similarity between the first physical topology and the second physical topology based on the foregoing method.

Refer to FIG. 1*b*. It is assumed that the first physical topology includes the AP 1, the AP 2, and the AP 3, and the second physical topology includes the AP 8, the AP 9, and the AP 10. The electronic device unifies the AP 1 and the AP 8 to a location of the AP 1, which is equivalent to translating the second physical topology to a location of the first physical topology, so that the AP 1 and the AP 8 overlap. Physical location information of the APs in the two physical topologies is adjusted based on physical location information of the AP 1. Then, the electronic device calculates a difference between adjusted physical location information of APs with a same relative location, for example, a Euclidean distance between adjusted physical location information of the AP 2 and the AP 9, and a Euclidean distance between adjusted physical location information of the AP 3 and the AP 10. Because the AP 1 and the AP 8 overlap, a difference between adjusted physical locations of the AP 1 and the AP 8 is 0. The electronic device may obtain, through calculation, the relative location difference between the APs in the two physical topologies based on a location difference between every two APs with a same relative location. The electronic device may separately calculate differences between geometric distances corresponding to edges (for example, AP 1-AP 3 and AP 8-AP 10, AP 1-AP 2 and AP 8-AP 9, and AP 2-AP 3 and AP 9-AP 10) with a same relative location, and then accumulate the differences between the geometric distances to obtain a geometric distance difference between the APs in the two physical topologies. The electronic device may determine the similarity between the first physical topology and the second physical topology based on the relative location difference between the APs in the two physical topologies, the geometric distance difference between the APs in the two physical topologies, and corresponding comparison thresholds.

In an example, the electronic device divides the physical topologies into a plurality of sub-topologies, and determines a similarity between the physical topologies based on a quantity or a proportion of isomorphic sub-topologies.

For the first physical topology and the second physical topology, the electronic device divides the first physical topology into a plurality of first sub-topologies, and divides the second physical topology into a plurality of second sub-topologies. Then, the electronic device determines isomorphic sub-topologies based on the plurality of first sub-topologies and the plurality of second sub-topologies. The electronic device determines the similarity between the first physical topology and the second physical topology based on a quantity or a proportion of the isomorphic sub-topologies.

In an embodiment of the application, the sub-topologies are subgraphs, and the isomorphic sub-topologies are isomorphic subgraphs.

Figures 5A, 5B, 5C:
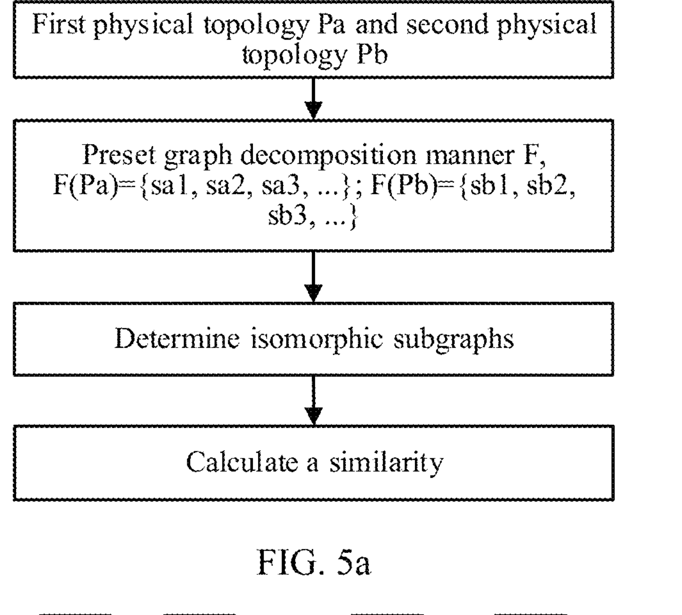
FIG. 5*a* is a schematic flowchart of calculating a physical topology similarity according to an embodiment of this application.
FIG. 5*b* is a schematic diagram of a topology of an AP group according to an embodiment of this application.
FIG. 5*c* is a schematic diagram of geometric distances between APs in the AP group in FIG. 5*b;*

Refer to FIG. 5*a*. FIG. 5*a* is a schematic flowchart of a method for calculating a physical topology similarity according to an embodiment of this application. The method may be applied to an electronic device.

S1. Perform subgraph decomposition on a first physical topology Pa in a preset graph decomposition manner to obtain a first subgraph set F(Pa)={sa1, sa2, sa3, . . . }, and perform subgraph decomposition on a second physical topology Pb to obtain a second subgraph set F(pb)={sb1, sb2, sb3, . . . }. The preset graph decomposition manner is: for each AP in the physical topology, using the AP as a root node, and using the root node, a preset quantity of leaf nodes APs that are in the physical topology and that have closet geometric distances from the root node, and an edge between the root node and each leaf node AP as a subgraph of the physical topology. In other words, each subgraph includes a preset quantity of APs in the physical topology and edges between the APs.

The following describes the subgraph of the physical topology by using an example in which the preset quantity is three. Refer to FIG. 5*b* and FIG. 5*c*. FIG. 5*b* is a schematic diagram of a topology of an AP group according to an embodiment of this application. FIG. 5*c* is a schematic diagram of geometric distances between APs in the AP group in FIG. 5*b*. It is assumed that an AP group includes an AP 1, an AP 2, an AP 3, an AP 4, an AP 5, and an AP 6. For example, the AP 1 is a root node. It can be learned from FIG. 5*c* that three leaf nodes (which are leaf nodes corresponding to geometric distances in a dashed-line box circle in FIG. 5*c*) that have closet geometric distances from the AP 1 are the AP 2, the AP 3, and the AP 4 respectively. Therefore, the root node AP 1, the leaf node AP 2, the leaf node AP 3, and the leaf node AP 4 may be used as a subgraph of a physical topology of the AP group. By analogy, a corresponding leaf node may be determined by using another node as the root node, and finally, six subgraphs of the physical topology may be obtained.

S2. Determine isomorphic subgraphs of the first physical topology Pa and the second physical topology Pb based on the first subgraph set and the second subgraph set.

In an embodiment, the isomorphic subgraphs are two subgraphs that meet an isomorphic subgraph condition in the first physical topology Pa and the second physical topology Pb.

S3. Determine a similarity between the first physical topology Pa and the second physical topology Pb based on the isomorphic subgraphs.

In an embodiment, a method for calculating the similarity between the first physical topology Pa and the second physical topology Pb based on the isomorphic subgraphs includes but is not limited to a subgraph isomorphism similarity calculation method or a Jaccard similarity calculation method.

For example, the subgraph isomorphism similarity calculation formula is:

$$K(Pa, Pb) = \frac{Num\{F(Pa) \cap F(Pb)\}}{Num\{F(Pb)\}}.$$

F (Pa)∩F(Pb) represents the isomorphic subgraphs of the first physical topology Pa and the second physical topology Pb, Num{F(Pa)∩F(Pb)} represents the quantity of groups of the isomorphic subgraphs of the foregoing two physical topologies, and Num{F(Pb)} represents the quantity of subgraphs in the second subgraph set F(Pb). K(Pa, Pb) is a physical topology similarity of Pa relative to Pb. For example, the first physical topology Pa (where it is assumed that an AP 1 to an AP 10 are included) and the second physical topology Pb (where it is assumed that an AP 11 to an AP 22 are included) include two groups of isomorphic subgraphs. In this case, it may be determined that Num{F (Pb)} is 12, and the physical topology similarity K(Pa, Pb) of Pa relative to Pb is $2/12=1/6$.

Correspondingly, $$K(Pb, Pa) = \frac{Num\{F(Pa) \cap F(Pb)\}}{Num\{F(Pa)\}}$$

represents a physical topology similarity of Pb relative to Pa, and Num{F(Pa)} represents the quantity of subgraphs in the first subgraph set F(Pa).

For example, the Jaccard similarity calculation formula is:

$$K(Pa, Pb) = \frac{Num\{F(Pa) \cap F(Pb)\}}{Num\{F(Pa) \cup F(b)\}}.$$

F(Pa)∪F(Pb) represents a union set of the first physical topology Pa and the second physical topology Pb, and Num{F(Pa)∪F(Pb)} represents a total quantity of subgraphs of the two physical topologies.

When the quantity of groups of the isomorphic subgraphs of the two physical topologies is 0, it may be determined that the similarity between the two physical topologies is 0.

Figure 5D:
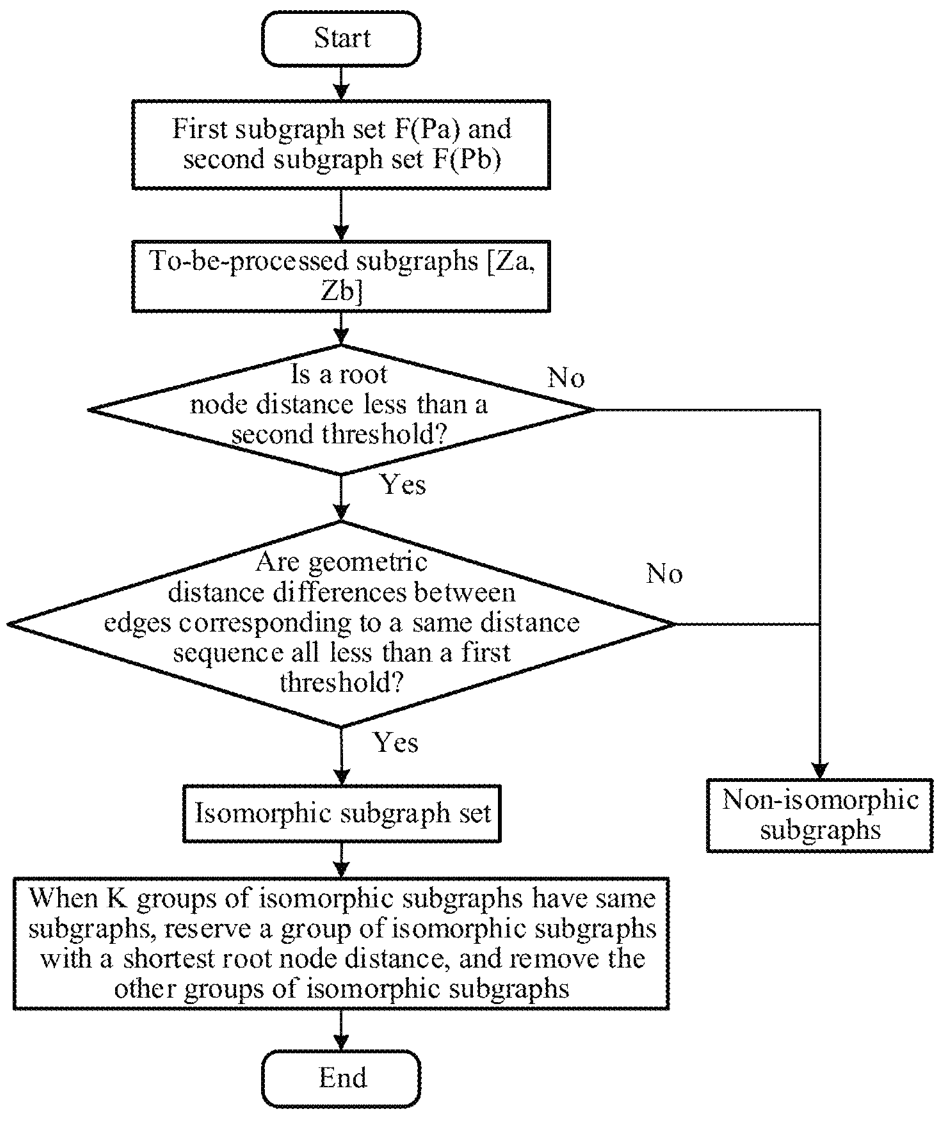
FIG. 5*d* is a schematic flowchart of determining isomorphic subgraphs according to an embodiment of this application.

Refer to FIG. 5*d*. FIG. 5*d* is a schematic flowchart of determining isomorphic subgraphs according to an embodiment of this application. The determining the isomorphic subgraphs of the first physical topology and the second physical topology based on the first subgraph set and the second subgraph set includes the following operations.

S4. For each root node X in the first subgraph set F(Pa), determine, as a group of to-be-processed subgraphs [Za, Zb], a subgraph in which a root node Y that is in the second subgraph set F(Pb) and that has a shortest geometric distance from the root node X is located and a subgraph in which the root node X is located.

In an embodiment, refer to FIG. 5*e*. FIG. 5*e* is a schematic diagram of matched subgraphs according to an embodiment of this application. It is assumed that both a first physical topology 501 and a second physical topology 502 include six APs. The first physical topology 501 may be understood as being disposed on the first layer of a building, and the second physical topology 502 is disposed on the second layer of the building. For a first root node 503 in the first physical topology 501, it may be determined, based on a principle of a shortest geometric distance between root nodes, that a corresponding to-be-processed subgraph is a subgraph in which a second root node 504 in the second physical topology 502 is located. In other words, a subgraph in which the first root node 503 is located and the subgraph in which the second root node 504 is located are a group of to-be-processed subgraphs. Similarly, the remaining five groups of to-be-processed subgraphs of the first physical topology Pa and the second physical topology Pb may be determined.

S5. For each group of to-be-processed subgraphs [Za, Zb], sort geometric distances corresponding to edges in each to-be-processed subgraph; and when geometric distance differences between edges corresponding to a same distance sequence in a group of to-be-processed subgraphs are all less than a first threshold, determine the group of to-be-processed subgraphs as isomorphic subgraphs of the first physical topology and the second physical topology.

In an embodiment, a value of the first threshold may be set based on an actual situation, and is not limited. An isomorphic subgraph condition in an embodiment is that geometric distance differences between edges corresponding to a same distance sequence in a group of to-be-processed subgraphs are all less than the first threshold. When a geometric distance difference between edges corresponding to at least one same distance rank in a group of to-be-processed subgraphs is greater than or equal to the first threshold, it may be determined that the group of to-be-processed subgraphs are non-isomorphic subgraphs. In an embodiment of the application, when isomorphic subgraphs are being determined, distances of edges may not be sorted, and geometric distance differences of corresponding edges in the two subgraphs are directly calculated. When geometric distance differences of a proportion of edges are all less than a threshold, or a sum of geometric distance differences of all edges is less than a threshold, the two subgraphs are determined as isomorphic subgraphs.

Refer to FIG. 5*c*. Assuming that a subgraph in which a root node AP 1 is located and a subgraph in which a root node AP 2 is located are a group of to-be-processed subgraphs, and each subgraph has three edges, edges with a same distance rank are sequentially AP 1–AP 2 and AP 2–AP 3, AP 1–AP 3 and AP 2–AP 1, and AP 1–AP 4 and AP 2–AP 4.

Further, refer to FIG. 5*d*. Before determining the geometric distance difference of each group of to-be-processed subgraphs, it may be first determined whether a root node distance of each group of to-be-processed subgraphs is less than a second threshold, to accelerate a speed of determining the isomorphic subgraphs. The root node distance of the group of to-be-processed subgraphs is a geometric distance between two root nodes in the group of to-be-processed subgraphs. A value of the second threshold may be set based on an actual situation, and is not limited. For example, the second threshold of the group of to-be-processed subgraphs may be a half of an average AP distance of an AP group in which at least one to-be-processed subgraph in the group of to-be-processed subgraphs is located. An average AP distance of an AP group is an average value of geometric distances between every two APs in the AP group. For another example, the second threshold of the to-be-processed subgraphs may be a half of an average AP distance of an entire wireless network, and the average AP distance of the wireless network is an average value of geometric distances between every two APs in the wireless network.

In this case, the isomorphic subgraph condition in an embodiment is whether the root node distance of the group of to-be-processed subgraphs is less than the second threshold, and the geometric distance differences between the edges corresponding to the same distance rank in the group of to-be-processed subgraphs are all less than the first threshold. When the root node distance of the group of to-be-processed subgraphs is greater than or equal to the second threshold, it may be determined that the group of to-be-processed subgraphs are non-isomorphic subgraphs. When the root node distance of the group of to-be-processed subgraphs is less than the second threshold, it may be determined that the group of to-be-processed subgraphs are matched subgraphs that meet location matching (which refers to that locations of APs in the group of to-be-processed subgraphs correspond to each other), and a next determining step may be performed. When the root node distance of the group of to-be-processed subgraphs is less than the second threshold, and the geometric distance difference between the edges corresponding to the at least one same distance rank in the group of to-be-processed subgraphs is greater than or equal to the first threshold, it may be determined that the group of to-be-processed subgraphs are non-isomorphic subgraphs. In other words, in this case, matched subgraphs that meet a condition limited by the first threshold are isomorphic subgraphs.

FIG. 5*e* shows two physical topologies located on different floors. When two physical topologies are located on a same floor, the two physical topologies may be separately used as two entireties, and the two entireties are disposed at a same coordinate origin, and then processing such as operation S4 and operation S5 is performed on the two physical topologies. Refer to FIG. 5*e*. For example, it is assumed that the first physical topology 501 and the second physical topology 502 are located on a same floor. The first root node 503 in the first physical topology 501 may be used as a coordinate origin, and the second root node 504 at a corresponding location in the second physical topology 502 is translated to the coordinate origin, to implement overall movement of the second physical topology 502. Then, similarity calculation is performed on the first physical topology 501 and the second physical topology 502. Alternatively, the second root node 504 in the second physical topology 502 may be used as the coordinate origin, and the first root node 503 in the first physical topology 501 may be moved to the coordinate origin, to implement overall movement of the first physical topology 501.

After the plurality of groups of to-be-processed subgraphs between the first physical topology and the second physical topology are determined, an isomorphic subgraph set between the plurality of groups of to-be-processed subgraphs may be obtained. Further, refer to FIG. 5*d*. In some possible embodiments, the determining the isomorphic subgraphs of the first physical topology and the second physical topology based on the first subgraph set and the second subgraph set further includes the following operations:

In the plurality of groups of isomorphic subgraphs of the first physical topology and the second physical topology, when K groups of isomorphic subgraphs have same subgraphs, reserving an isomorphic relationship of a group of isomorphic subgraphs with a shortest root node distance in the K groups of isomorphic subgraphs, and removing isomorphic relationships of the other groups of isomorphic subgraphs in the K groups of isomorphic subgraphs.

In an embodiment, a subgraph may have a plurality of isomorphic subgraphs. Optimal and unique isomorphic subgraphs are selected based on a principle of a shortest root node distance, and the isomorphic relationships of the other groups of isomorphic subgraphs are deleted. Refer to FIG. 5*e*. Assuming that a third root node 505 does not exist, both the to-be-processed subgraph corresponding to the second root node 504 and a to-be-processed subgraph corresponding to a fourth root node 506 are the subgraph in which the first root node 503 is located. Assuming that the subgraph in which the first root node 503 is located and the subgraph in which the second root node 504 is located meet the foregoing isomorphic subgraph condition, and the subgraph in which the first root node 503 is located and the subgraph in which the fourth root node 506 is located also meet the isomorphic subgraph condition, an isomorphic relationship of the subgraph in which the fourth root node 506 is located is deleted based on the principle of the shortest root node distance. Assuming that none of the other groups of to-be-processed subgraphs meets the isomorphic subgraph condition, the isomorphic subgraphs of the first physical topology 501 and the second physical topology 502 are the subgraph in which the first root node 503 is located and the subgraph in which the second root node 504 is located.

A repeated isomorphic relationship of a same subgraph is removed, the precision of the isomorphic subgraphs of the physical topologies can be improved, thereby improving the precision of the physical topology similarity.

The foregoing operation numbers such as operation S1 and operation S2 are merely used to distinguish different operations, and do not limit an execution sequence of the operations.

In an embodiment, the first physical topology further includes building structure information corresponding to a building on which the first AP group is installed, and the second physical topology further includes building structure information corresponding to a building on which the second AP group is installed.

In this solution, in addition to physical location information of each AP in the AP group, the physical topology further includes the building structure information of the building on which the AP group is installed. The building structure information includes at least one of the following: internal layout structure information, wall material information, and the like. The internal layout structure information includes at least one of the following: the quantity of partition spaces, the size of the partition spaces, locations of the partition spaces, and the like.

The wall material information includes wood, a brick and concrete mixed material, or a metal material (such as steel and iron). Different wall materials have different impact on AP signal transmission. As a result, signal transmission environments of AP groups installed in spaces formed by different wall materials are different. Radio signals of the AP use a radio microwave frequency band of 2.4 GHz, 5 GHZ, or the like, and are propagated in a straight line, which is a distinguished feature of the radio signals. Therefore, after passing through a wall, the radio signals are severely affected. A common wall causes 5 dBm to 10 dBm attenuation of the radio signals, and a wireless device behind the wall may receive only a weak signal. Therefore, a thicker wall and the greater quantity of walls indicate stronger signal attenuation. A metal obstacle not only blocks the microwave radio signals, but also absorbs electromagnetic energy. Therefore, AP signals passing through the metal obstacle become excessively weak. Alternatively, the AP signals cannot pass through the metal obstacle at all.

Because the building structure information affects the AP signal transmission, the building structure information is added as a basis for determining the physical topology similarity, to improve the precision of determining the physical topology similarity between the two AP groups, and help adjust bandwidths of the AP groups more accurately.

In addition, a building structure similarity corresponding to the two AP groups may be obtained through calculation based on the building structure information of the two AP groups. A calculation method may be a method in the conventional technology, and is not limited. For example, it is assumed that the building structure information includes four types of information: the quantity, the size, and the locations of the partition spaces, and wall materials, and the internal layout structure information and the wall material information respectively account for 50% of importance. When the building structure information corresponding to the two AP groups is completely the same, for example, the quantity, the size, and the locations of the partition spaces, and the wall materials are all the same, it is determined that the building structure similarity between the two AP groups is 100%. On the contrary, when at least one of the following: the quantity, the size, and the locations of the partition spaces is different, it is determined that the building structure similarity between the two AP groups is 50%. Similarly, when only the wall materials are different, it is determined that the building structure similarity between the two AP groups is 50%.

Further, in addition to a physical topology structure similarity, the similarity in operation 202 further includes a building structure similarity of AP groups. In this case, the similarity threshold in operation 202 should include a physical similarity threshold for determining the physical topology structure similarity and a structure similarity threshold for determining the building structure similarity. When a physical topology structure similarity between the two AP groups is greater than the physical similarity threshold, and the building structure similarity between the two AP groups is greater than the structure similarity threshold, it may be determined that the physical topologies of the two AP groups meet a similarity condition. Values of the physical similarity threshold and the structure similarity threshold may be set based on an actual situation.

In addition, weighted calculation may be performed based on the physical topology structure similarity and the building structure similarity between the two AP groups and respective weights of the two AP groups (where a sum of the weights of the two AP groups is 1, and a value may be adjusted based on an actual situation), to obtain a final similarity, and then the similarity is compared with a similarity threshold (where, in this case, only one similarity threshold is required), to determine a physical topology similarity between the two AP groups.

After bandwidth configuration is completed for an AP group in an area, when bandwidth configuration needs to be performed on an AP group in another area, a bandwidth configuration scheme may be migrated based on a physical topology similarity between the AP groups in the two areas. When physical topologies of the AP groups in the two areas are similar, the bandwidth configuration scheme of the AP group in the foregoing area is directly applied to the other area. This can effectively improve the bandwidth configuration efficiency.

Refer to FIG. 6. FIG. 6 is a schematic flowchart of another bandwidth configuration method according to an embodiment of this application. The method may be applied to an electronic device. The bandwidth configuration method 600 includes operation 601 and operation 602.

601. Obtain a bandwidth configuration scheme of a first AP group.

602. When a similarity between a first physical topology corresponding to the first AP group and a second physical topology corresponding to a second AP group is greater than a similarity threshold, determine the bandwidth configuration scheme of the first AP group as a bandwidth configuration scheme of the second AP group.

The first AP group and the second AP group each include a plurality of APs. The first physical topology includes physical location information of the plurality of APs in the first AP group. The second physical topology includes physical location information of the plurality of APs in the second AP group.

In an embodiment, a value of the similarity threshold may be set based on an actual situation, and is not limited.

In an embodiment of the application, because a physical topology of an AP group is stable and not easy to change, a bandwidth configuration scheme of the AP group can be migrated based only on the physical topology similarity between the AP groups, so that not only bandwidth configuration efficiency of the AP group can be effectively improved, but also stability of a bandwidth configuration result of the AP group can be ensured, in other words, stability of a bandwidth configuration of the AP is ensured.

For example, a first building includes one AP group, and a bandwidth configuration scheme of the AP group is known. In addition, currently there is a second building, a third building, and a fourth building. When it is determined that the AP group of the first building and AP groups of the second building, the third building, and the fourth building separately meet a similarity threshold determining condition, the bandwidth configuration scheme of the AP group of the first building may be directly applied to the second building, the third building, and the fourth building, to implement bandwidth configuration scheme migration, so as to effectively improve bandwidth configuration efficiency.

In some possible embodiments, the first physical topology further includes building structure information corresponding to a building on which the first AP group is installed, and the second physical topology further includes building structure information corresponding to a building on which the second AP group is installed. The building structure information is added as a basis for determining the physical topology similarity, so that precision of determining a physical topology similarity between two AP groups is improved, thereby helping adjust bandwidths of the AP groups more accurately.

In some possible embodiments, the electronic device determines the bandwidth configuration scheme of the first AP group based on a neighbor relationship between the APs in the first AP group.

In some possible embodiments, the electronic device determines information about a geometric distance between every two APs in the AP group based on physical location information of the APs in the AP group, and determines, based on the physical location information of the APs in the AP group and the information about the geometric distance between every two APs in the AP group, the physical topology corresponding to the AP group.

In some possible embodiments, the electronic device determines the similarity between the first physical topology and the second physical topology based on AP information of the first physical topology and AP information of the second physical topology. The AP information includes a geometric distance between APs and information about a mutual location between the APs.

In an embodiment, the electronic device divides the first physical topology into a plurality of first sub-topologies, divides the second physical topology into a plurality of second sub-topologies, determines isomorphic sub-topologies based on the plurality of first sub-topologies and the plurality of second sub-topologies, and determines the similarity between the first physical topology and the second physical topology based on a quantity or a proportion of the isomorphic sub-topologies.

For descriptions of each operation in the bandwidth configuration method 600 in an embodiment of the application, refer to related descriptions of the foregoing bandwidth configuration method 200. Details are not described again.

Refer to FIG. 7. FIG. 7 is a schematic diagram of a structure of a bandwidth configuration apparatus according to an embodiment of this application. The bandwidth configuration apparatus 700 includes a determining module 701 and an adjustment module 702. The determining module 701 is configured to perform operation 201 in the embodiment shown in FIG. 2, and the adjustment module 702 is configured to perform operation 202 in the embodiment shown in FIG. 2.

The determining module 701 is configured to determine bandwidth configuration schemes of N AP groups. Each AP group includes a plurality of APs. A bandwidth configuration scheme of an AP group includes a bandwidth of each AP in the AP group. N is an integer greater than or equal to 2.

The adjustment module 702 is configured to adjust a bandwidth of an AP in a first AP group or a second AP group based on a similarity between a first physical topology corresponding to the first AP group and a second physical topology corresponding to the second AP group.

When the similarity between the first physical topology corresponding to the first AP group and the second physical topology corresponding to the second AP group is greater than a similarity threshold, and a bandwidth of a first AP in the first AP group is greater than a bandwidth of a second AP corresponding to the first AP in the second physical topology, the bandwidth of the second AP in a bandwidth configuration scheme of the second AP group is adjusted to the bandwidth of the first AP. When the similarity between the first physical topology and the second physical topology is greater than the similarity threshold, and the bandwidth of the first AP is less than the bandwidth of the second AP, the bandwidth of the first AP in a bandwidth configuration scheme of the first AP group is adjusted to the bandwidth of the second AP.

The N AP groups include the first AP group and the second AP group. The first physical topology includes physical location information of a plurality of APs in the first AP group, and the second physical topology includes physical location information of a plurality of APs in the second AP group.

In an embodiment, APs in a same AP group have a same bandwidth.

In an embodiment, the first physical topology further includes building structure information corresponding to a building on which the first AP group is installed, and the second physical topology further includes building structure information corresponding to a building on which the second AP group is installed.

In an embodiment, the determining module 701 is configured to determine the bandwidth configuration scheme of each AP group based on a neighbor relationship between the APs in each AP group.

In an embodiment, the determining module 701 is further configured to determine information about a geometric distance between every two APs in the AP group based on physical location information of the APs in the AP group, and determine, based on the physical location information of the APs in the AP group and the information about the geometric distance between every two APs in the AP group, a physical topology corresponding to the AP group.

In an embodiment, the adjustment module 702 is further configured to determine the similarity between the first physical topology and the second physical topology based on AP information of the first physical topology and AP information of the second physical topology. The AP information includes a geometric distance between APs and information about a mutual location between the APs.

In an embodiment, the adjustment module 702 is further configured to:

divide the first physical topology into a plurality of first sub-topologies, and divide the second physical topology into a plurality of second sub-topologies;

determine isomorphic sub-topologies based on the plurality of first sub-topologies and the plurality of second sub-topologies; and determine the similarity between the first physical topology and the second physical topology based on a quantity or a proportion of the isomorphic sub-topologies.

It should be noted that, for an execution process and a corresponding beneficial effect of the bandwidth configuration apparatus 700, refer to the related descriptions of the bandwidth configuration method 200. Details are not described again.

Figure 8:
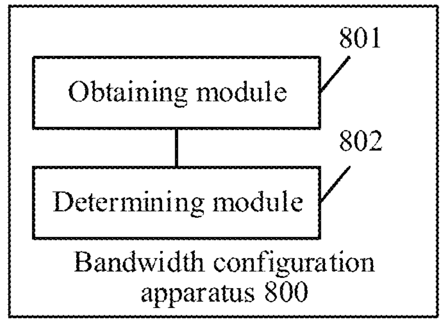
FIG. 8 is a schematic diagram of a structure of another bandwidth configuration apparatus according to an embodiment of this application.

Refer to FIG. 8. FIG. 8 is a schematic diagram of a structure of another bandwidth configuration apparatus according to an embodiment of this application. The bandwidth configuration apparatus 800 includes an obtaining module 801 and a determining module 802. The obtaining module 801 is configured to perform operation 601 in the embodiment shown in FIG. 6, and the determining module 802 is configured to perform operation 602 in the embodiment shown in FIG. 6.

The obtaining module 801 is configured to obtain a bandwidth configuration scheme of a first AP group.

The determining module 802 is configured to: when a similarity between a first physical topology corresponding to the first AP group and a second physical topology corresponding to a second AP group is greater than a similarity threshold, determine the bandwidth configuration scheme of the first AP group as a bandwidth configuration scheme of the second AP group.

The first AP group and the second AP group each include a plurality of APs. The first physical topology includes physical location information of the plurality of APs in the first AP group. The second physical topology includes physical location information of the plurality of APs in the second AP group.

In an embodiment, the first physical topology further includes building structure information corresponding to a building on which the first AP group is installed, and the second physical topology further includes building structure information corresponding to a building on which the second AP group is installed.

In an embodiment, the obtaining module 801 is configured to determine the bandwidth configuration scheme of the first AP group based on a neighbor relationship between the APs in the first AP group.

In an embodiment, the determining module 802 is further configured to determine the similarity between the first physical topology and the second physical topology based on AP information of the first physical topology and AP information of the second physical topology. The AP information includes a geometric distance between APs and information about a mutual location between the APs.

In an embodiment, the determining module 802 is further configured to:

divide the first physical topology into a plurality of first sub-topologies, and divide the second physical topology into a plurality of second sub-topologies;

determine isomorphic sub-topologies based on the plurality of first sub-topologies and the plurality of second sub-topologies; and determine the similarity between the first physical topology and the second physical topology based on a quantity or a proportion of the isomorphic sub-topologies.

It should be noted that, for an execution process and a corresponding beneficial effect of the bandwidth configuration apparatus 800, refer to the descriptions of the bandwidth configuration method 600. Details are not described again.

Figure 9:
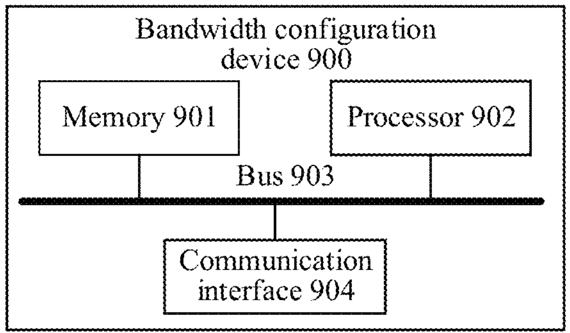
FIG. 9 is a schematic diagram of a structure of a bandwidth configuration device according to an embodiment of this application.

Refer to FIG. 9. FIG. 9 is a schematic diagram of a structure of a bandwidth configuration device according to an embodiment of this application. A bandwidth configuration device 900 includes a memory 901, a processor 902, a communication interface 904, and a bus 903. Mutual communication connection between the memory 901, the processor 902, and the communication interface 904 is implemented by using the bus 903.

The memory 901 may be a read-only memory (ROM), a static storage device, a dynamic storage device, or a random access memory (RAM). The memory 901 may store a program. When the program stored in the memory 901 is executed by the processor 902, the processor 902 is configured to perform the operations of the bandwidth configuration method in any one of the foregoing embodiments.

The processor 902 may be a general-purpose central processing unit (CPU), a microprocessor, an application-specific integrated circuit (ASIC), a graphics processing unit (GPU), or one or more integrated circuits, and is configured to execute a related program, to implement functions that need to be performed by units in the bandwidth configuration apparatus in any one of the foregoing embodiments, or perform the bandwidth configuration method in any one of the foregoing embodiments.

The processor 902 may alternatively be an integrated circuit chip with a signal processing capability. In an embodiment, the steps of the bandwidth configuration method in any embodiment in this application may be completed by using an integrated logic circuit of hardware in the processor 902 or instructions in a software form. The foregoing processor 902 may alternatively be a general-purpose processor, a digital signal processor (DSP), an application-specific integrated circuit (ASIC), a field programmable gate array (FPGA) or another programmable logical device, a discrete gate or transistor logic device, or a discrete hardware component. The processor 902 may implement or perform the methods, the steps, and logical block diagrams disclosed in embodiments of this application. The general-purpose processor may be a microprocessor, or the processor may be any conventional processor, or the like. The steps of the bandwidth configuration methods described with reference to any embodiment of this application may be directly performed and completed by a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory 901. The processor 902 reads information from the memory 901, and in combination with the hardware of the processor 902, implements the functions that need to be performed by the units included in the bandwidth configuration apparatus in any one of the foregoing embodiments, or performs the bandwidth configuration method in any embodiment of this application.

The communication interface 904 uses a transceiver apparatus, for example but not limited to, a transceiver, to implement communication between the bandwidth configuration device 900 and another device or communication network. For example, the bandwidth configuration device 900 may obtain geometric distance data or AP group data between every two APs through the communication interface 904.

The bus 903 may include a path for transmitting information between the components (for example, the memory 901, the processor 902, and the communication interface 904) of the bandwidth configuration device 900.

It should be noted that although only the memory, the processor, and the communication interface are shown in the bandwidth configuration device 900 shown in FIG. 9, in an embodiment, one of ordinary skilled in the art should understand that the bandwidth configuration device 900 further includes other components necessary for implementing normal operation. In addition, based on a requirement, one of ordinary skilled in the art should understand that the bandwidth configuration device 900 may further include a hardware component for implementing another additional function. In addition, one of ordinary skilled in the art should understand that the bandwidth configuration device 900 may alternatively include only devices necessary for implementing embodiments of this application, but does not necessarily include all the components shown in FIG. 9.

It may be clearly understood by one of ordinary skilled in the art that, for the purpose of convenient and brief description, for working processes of the foregoing systems, apparatuses, and units, refer to corresponding processes in the foregoing method embodiments. Details are not described herein again.

In embodiments provided in this application, it should be understood that the disclosed systems, apparatuses and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a computer program product. The computer program product is stored in a storage medium, and includes several instructions for instructing a computer device (which may be a personal computer, a server, a network device, or the like) to perform all or some of the steps of the methods in embodiments of this application. The foregoing storage medium includes media such as a USB flash drive, a removable hard disk, a read-only memory (ROM), a random access memory (RAM), a magnetic disk, an optical disc, or the like, that can store program code.

An embodiment of this application further provides a chip, and the chip includes a processor and a data interface. The processor reads, by using the data interface, instructions stored in a memory to perform the bandwidth configuration method in any embodiment.

In an embodiment, the chip may further include a memory, and the memory stores the instructions. The processor is configured to execute the instructions stored in the memory, and when the instructions are executed, the processor is configured to perform the bandwidth configuration method in any embodiment.

One of ordinary skill in the art may be aware that the units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this application.

The foregoing descriptions are merely implementations of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A method for bandwidth configuration performed by a bandwidth configuration apparatus, comprising:

determining, by a processor of the bandwidth configuration apparatus, bandwidth configuration of a plurality of access point (AP) groups, wherein each AP group comprises a plurality of APs, the bandwidth configuration of each AP group comprises a bandwidth of each AP in the plurality of APs in each AP group;

in response to determining that a similarity between a first physical topology corresponding to a first AP group and a second physical topology corresponding to a second AP group is greater than a similarity threshold, and a bandwidth of a first AP in the first AP group is greater than a bandwidth of a second AP corresponding to the first AP in the second physical topology, adjusting, by the processor of the bandwidth configuration apparatus, the bandwidth of the second AP in a bandwidth configuration of the second AP group to the bandwidth of the first AP; and in response to determining that the similarity between the first physical topology and the second physical topology is greater than the similarity threshold, and the bandwidth of the first AP is less than the bandwidth of the second AP, adjusting, by the processor of the bandwidth configuration apparatus, the bandwidth of the first AP in a bandwidth configuration of the first AP group to the bandwidth of the second AP, wherein the plurality of AP groups comprise the first AP group and the second AP group, the first physical topology comprises physical location information of a plurality of APs in the first AP group, and the second physical topology comprises physical location information of a plurality of APs in the second AP group.

2. The method according to claim 1, wherein bandwidths of the plurality of APs in the first AP group are the same, and bandwidths of the plurality of APs in the second AP group are the same.

3. The method according to claim 1, wherein the first physical topology further comprises building structure information corresponding to a building on which the first AP group is installed, and the second physical topology further comprises building structure information corresponding to a building on which the second AP group is installed.

4. The method according to claim 1, wherein the determining bandwidth configuration of the plurality of AP groups comprises:

determining, by the processor, the bandwidth configuration of each AP group based on a neighbor relationship between the APs in each AP group.

5. The method according to claim 1, further comprising:

determining information about a geometric distance between every two APs in each AP group based on physical location information of the APs in each AP group; and determining, by the processor based on the physical location information of the APs in each AP group and the information about the geometric distance between every two APs in each AP group, a physical topology corresponding to each AP group.

6. The method according to claim 1 further comprising:

determining, by the processor, the similarity between the first physical topology and the second physical topology based on AP information of the first physical topology and AP information of the second physical topology, wherein the AP information comprises a geometric distance between APs and information about a mutual location between the APs.

7. The method according to claim 1, further comprising:

dividing, by the processor, the first physical topology into a plurality of first sub-topologies, and dividing the second physical topology into a plurality of second sub-topologies;

determining, by the processor isomorphic sub-topologies based on the plurality of first sub- topologies and the plurality of second sub-topologies; and determining the similarity between the first physical topology and the second physical topology based on a quantity or a proportion of the isomorphic sub-topologies.

8. A method for bandwidth configuration, comprising:

obtaining, by a processor, a bandwidth configuration of a first access point (AP) group; and in response to determining that a similarity between a first physical topology corresponding to the first AP group and a second physical topology corresponding to a second AP group is greater than a similarity threshold, determining the bandwidth configuration of the first AP group as a bandwidth configuration of the second AP group, wherein the first AP group and the second AP group each comprise a plurality of APs, the first physical topology comprises physical location information of the plurality of APs in the first AP group, and the second physical topology comprises physical location information of the plurality of APs in the second AP group.

9. The method according to claim 8, wherein the first physical topology further comprises building structure information corresponding to a building on which the first AP group is installed, and the second physical topology further comprises building structure information corresponding to a building on which the second AP group is installed.

10. An apparatus, comprising:

a processor, and a memory coupled to the processor to store instructions, which when executed by the processor, cause the apparatus to perform operations, the operations comprising:

determining bandwidth configuration of a plurality of access point (AP) groups, wherein each AP group comprises a plurality of APs, the bandwidth configuration of each AP group comprises a bandwidth of each AP in the plurality of APs in each AP group; and in response to determining that a similarity between a first physical topology corresponding to a first AP group and a second physical topology corresponding to a second AP group is greater than a similarity threshold, and a bandwidth of a first AP in the first AP group is greater than a bandwidth of a second AP corresponding to the first AP in the second physical topology, adjusting the bandwidth of the second AP in a bandwidth configuration of the second AP group to the bandwidth of the first AP; and in response to determining that the similarity between the first physical topology and the second physical topology is greater than the similarity threshold, and the bandwidth of the first AP is less than the bandwidth of the second AP, adjusting the bandwidth of the first AP in a bandwidth configuration of the first AP group to the bandwidth of the second AP, wherein the plurality of AP groups comprise the first AP group and the second AP group, the first physical topology comprises physical location information of a plurality of APs in the first AP group, and the second physical topology comprises physical location information of a plurality of APs in the second AP group.

11. The apparatus according to claim 10, wherein bandwidths of the plurality of APs in the first AP group are the same, and bandwidths of the plurality of APs in the second AP group are the same.

12. The apparatus according to claim 10, wherein the first physical topology further comprises building structure information corresponding to a building on which the first AP group is installed, and the second physical topology further comprises building structure information corresponding to a building on which the second AP group is installed.

13. The apparatus according to claim 10, the operations further comprising:

determining the bandwidth configuration of each AP group based on a neighbor relationship between the APs in each AP group.

14. The apparatus according to claim 10, the operations further comprising:

determining information about a geometric distance between every two APs in each AP group based on physical location information of the APs in each AP group; and determining, based on the physical location information of the APs in each AP group and the information about the geometric distance between every two APs in each AP group, a physical topology corresponding to each AP group.

15. The apparatus according to claim 10, the operations further comprising:

determining the similarity between the first physical topology and the second physical topology based on AP information of the first physical topology and AP information of the second physical topology, wherein the AP information comprises a geometric distance between APs and information about a mutual location between the APs.

16. The apparatus according to claim 10, the operations further comprising:

dividing the first physical topology into a plurality of first sub-topologies, and divide the second physical topology into a plurality of second sub-topologies;

determining isomorphic sub-topologies based on the plurality of first sub-topologies and the plurality of second sub-topologies; and determining the similarity between the first physical topology and the second physical topology based on a quantity or a proportion of the isomorphic sub-topologies.

* * * * *